United States Patent
Jones et al.

[11] Patent Number: 5,882,749
[45] Date of Patent: Mar. 16, 1999

[54] EASY-OPENING RECLOSABLE PACKAGE

[75] Inventors: Gregory K. Jones, Neenah; Richard M. Ziegert, Appleton; Gregory J. Seeke, Oshkosh; Russell P. Gehrke, Neenah, all of Wis.

[73] Assignee: Pechiney Recherche, France

[21] Appl. No.: 947,679

[22] Filed: Jul. 2, 1997

Related U.S. Application Data

[63] Continuation of Ser. No. 482,119, Jun. 8, 1995, abandoned.

[51] Int. Cl.$^6$ .............................. B32B 7/12; B32B 27/08
[52] U.S. Cl. ..................... 428/35.2; 428/34.8; 428/349; 428/516
[58] Field of Search ................................ 428/349, 346, 428/516, 518, 35.2, 34.8

[56] References Cited

U.S. PATENT DOCUMENTS

| | | | |
|---|---|---|---|
| 2,758,519 | 8/1956 | Steen ........................................ | 493/224 |
| 3,269,278 | 8/1966 | Olstead .................................... | 493/210 |
| 3,272,422 | 9/1966 | Miller ...................................... | 229/43 |
| 3,454,210 | 7/1969 | Spiegel et al. . | |
| 3,613,874 | 10/1971 | Miller ..................................... | 428/520 X |
| 3,655,829 | 4/1972 | Ronzoni et al. . | |
| 3,795,367 | 3/1974 | Mocarski . | |
| 3,827,625 | 8/1974 | Miller ..................................... | 383/211 |
| 4,100,237 | 7/1978 | Wiley . | |
| 4,188,441 | 2/1980 | Cook ...................................... | 428/216 |
| 4,243,725 | 1/1981 | Wiggins et al. . | |
| 4,292,355 | 9/1981 | Bonis . | |
| 4,329,310 | 5/1982 | Turczyk . | |
| 4,332,858 | 6/1982 | Saitoh et al. . | |
| 4,346,196 | 8/1982 | Hoh et al. ............................... | 525/196 |
| 4,419,482 | 12/1983 | Subramanian . | |
| 4,440,830 | 4/1984 | Wempe . | |
| 4,490,424 | 12/1984 | Gerace . | |
| 4,521,467 | 6/1985 | Berger ..................................... | 428/35 |
| 4,526,577 | 7/1985 | Schmidt et al. ......................... | 604/366 |
| 4,578,302 | 3/1986 | Schmidt et al. ......................... | 428/110 |
| 4,600,550 | 7/1986 | Cloren . | |
| 4,615,858 | 10/1986 | Su . | |
| 4,615,926 | 10/1986 | Hsu et al. . | |
| 4,618,151 | 10/1986 | Fadner . | |
| 4,656,068 | 4/1987 | Raines ..................................... | 428/35 |
| 4,671,987 | 6/1987 | Knott, II et al. . | |
| 4,673,601 | 6/1987 | Lamping et al. . | |
| 4,680,156 | 7/1987 | Collier . | |
| 4,691,372 | 9/1987 | Van Erden .............................. | 156/66 |
| 4,691,373 | 9/1987 | Ausnit .................................. | 428/40.1 X |

(List continued on next page.)

OTHER PUBLICATIONS

RPM 1000: Rotary Form/Fill/Seal Pouch Packager Brochure, Klockner Bartelt (date unknown).

New Bodolay/Pratt L–80 Horizontal Pouch Form/Fill/Seal Packaging Machine Brochure, Bodolay/Pratt (Jun. 1991).

*Primary Examiner*—Daniel Zirker
*Attorney, Agent, or Firm*—McDermott, Will & Emery

[57] ABSTRACT

A heat sealed, easy-opening and reclosable package, which comprises a packaging material comprised of a heat sealable base member material, and an elongate, multilayer, flexible, peelable and reclosable strip positioned between the surfaces of juxtaposed portions of base member material and comprised of an interior tacky adhesive layer, a first and second surface sealant layers, the strip including a rupturable layer proximate the tacky adhesive layer. The base member material is heat sealed together along and by means of the strip whereat the sealant layers of the strip are heat sealed to the base member. The heat seal has sufficient initial seal strength to remain closed during handling of the package and yet is manually readily openable and reclosable.

The base member material can be heat sealed together by each sealant layer being heat sealed to the same base member heat sealable surface, or by one strip sealant layer being heat sealed to one base member heat sealable surface and the other sealant layer being heat sealed to another heat sealable surface of the base member or of a base structure, which can be a container or a flat base structure.

39 Claims, 5 Drawing Sheets

U.S. PATENT DOCUMENTS

| | | |
|---|---|---|
| 4,764,404 | 8/1988 | Genske et al. . |
| 4,769,261 | 9/1988 | Hazelton et al. . |
| 4,778,697 | 10/1988 | Genske et al. . |
| 4,784,885 | 11/1988 | Carespodi . |
| 4,808,474 | 2/1989 | Sipinen . |
| 4,810,319 | 3/1989 | Isner . |
| 4,869,963 | 9/1989 | Gallucci et al. . |
| 4,876,123 | 10/1989 | Rivera et al. . |
| 4,892,700 | 1/1990 | Guerra et al. . |
| 4,909,017 | 3/1990 | McMahon et al. ............... 53/133.4 |
| 4,931,327 | 6/1990 | Liu et al. . |
| 4,994,322 | 2/1991 | Delgado et al. . |
| 5,002,811 | 3/1991 | Bauer et al. . |
| 5,036,643 | 8/1991 | Bodolay ........................ 493/213 |
| 5,041,316 | 8/1991 | Parneli et al. . |
| 5,066,526 | 11/1991 | German, Jr. . |
| 5,082,702 | 1/1992 | Alband . |
| 5,084,352 | 1/1992 | Percec et al. . |
| 5,085,927 | 2/1992 | Dohrer . |
| 5,089,320 | 2/1992 | Straus et al. . |
| 5,093,187 | 3/1992 | Engelmann et al. . |
| 5,103,979 | 4/1992 | Hustad ........................... 206/459 |
| 5,114,763 | 5/1992 | Brant et al. . |
| 5,126,174 | 6/1992 | Courtright et al. . |
| 5,132,392 | 7/1992 | Deyoung et al. . |
| 5,175,035 | 12/1992 | Pinsolle et al. . |
| 5,183,706 | 2/1993 | Bekele . |
| 5,196,266 | 3/1993 | Lu et al. . |
| 5,204,034 | 4/1993 | Sasame et al. . |
| 5,204,180 | 4/1993 | Nelson et al. . |
| 5,234,731 | 8/1993 | Ferguson . |
| 5,241,149 | 8/1993 | Watanabe et al. . |
| 5,247,781 | 9/1993 | Runge ............................ 493/213 |
| 5,264,265 | 11/1993 | Kaufmann . |
| 5,268,203 | 12/1993 | Batdorf . |
| 5,277,971 | 1/1994 | Weng et al. . |
| 5,281,453 | 1/1994 | Yamada et al. . |
| 5,284,694 | 2/1994 | Lockridge et al. . |
| 5,316,848 | 5/1994 | Bartlett et al. . |
| 5,317,044 | 5/1994 | Mooney et al. . |
| 5,330,269 | 7/1994 | Kamada et al. ..................... 383/5 |
| 5,346,735 | 9/1994 | Logan et al. . |
| 5,372,870 | 12/1994 | Diehl et al. . |
| 5,382,472 | 1/1995 | Yanidis et al. . |
| 5,389,448 | 2/1995 | Schirmer et al. . |
| 5,393,592 | 2/1995 | Jenne . |
| 5,400,568 | 3/1995 | Kanemitsu et al. ............. 493/213 |
| 5,401,546 | 3/1995 | Meattle . |
| 5,445,838 | 8/1995 | Lipinski et al. ................. 426/129 |
| 5,519,982 | 5/1996 | Herber et al. .................. 53/133.4 |

EASY-OPENING RECLOSABLE PACKAGE

This application is a continuation of Ser. No. 08/482,119, filed Jun. 8, 1995, now abandoned.

FIELD OF INVENTION

This invention relates to easy opening, reclosable packages, packaging materials and processes which employ a tacky adhesive material to provide the easy-opening, reclosable feature.

BACKGROUND OF THE INVENTION

Packaging materials, packages and processes which employ a layer of tacky or pressure sensitive adhesive to effect opening and reclosure features are known, but they are problematical or disadvantageous for various reasons. U.S. Patents which disclose such materials and packages are U.S. Pat. Nos. 3,454,210, 5,089,320 and 5,382,472.

U.S. Pat. No. 3,454,210 discloses packages made from a base web having a pressure sensitive adhesive layer all over it and which is covered by a bondable, rupturable film, which in turn is bonded to a base film to form the package. The package is opened by rupturing the rupturable film and pulling it from the pressure sensitive adhesive layer. This leaves a surface of pressure sensitive adhesive exposed and against which the web can be pressed to reseal the package.

A main disadvantage of the packaging materials and packages disclosed in U.S. Pat. No. 3,454,210 is that the entire web of the entire package carries the layer of the pressure sensitive adhesive. Since pressure sensitive adhesives are only needed where opening is to be effected, and since they are expensive materials, this approach is wasteful and excessively expensive. Also, pressure sensitive adhesives tend to give off objectionable odors which can be imparted to the packaged products, e.g. to food, and can be sensed by the consumer upon and after opening. The use of such adhesives on the entire packaging material magnifies the odor problem.

U.S. Pat. No. 5,089,320 discloses a similar flexible packaging material which is heat sealable to itself. The packaging material has a layer of tacky adhesive sandwiched between a skin layer of a heat sealable polymer and a substrate. The tacky adhesive is distributed throughout the material. The patent also discloses that since the tacky adhesive is required only in the area where the package is to be opened, the adhesive may be coated onto the substrate in register only where it is required. The skin layer may be similarly applied in register over the adhesive alone, such as by printing the adhesive layer and the skin layer onto the substrate sequentially using a central impression press. The skin layer may be applied to the other surface of areas of the substrate as well, including the entire surface of the packaging material. The patent also discloses the tacky adhesive may also be applied to the substrate by transferring it from the carrying medium and the skin may be transferred with the adhesive by this technique. The technique is known for transferring a thin layer of vapor deposited metal from one substrate to another. The carrying medium preferably is paper, coated on one or both sides with a silicone release agent. The paper carrier may be recycled or may be an endless belt for a continuous process.

The approach disclosed in U.S. Pat. No. 5,089,320 of distributing the tacky adhesive throughout the packaging material is disadvantageous for the reasons stated previously. Coating the tacky adhesive onto the substrate only where it is needed is disadvantageous because it requires extra and specially designed equipment for coating and aligning the tacky adhesive and the heat sealable skin layer. Also, registering the skin layer with the tacky adhesive and applying the coatings sequentially is complex and involves extra steps. Alignment and off-registration problems can occur. Applying the tacky adhesive with or without a skin layer from a carrier requires a carrier system and involves disposing of and wasting the paper carrier, or recycling it, special silicone coatings and equipment, and carrier conveying equipment.

U.S. Pat. No. 5,382,472 discloses a resealable packaging material made by side-by-side simultaneous coextrusion of several thermoplastic resins through a die to form a film having two or more bands of material which extend in the machine direction. The first band contains conventional packaging polymers and no pressure sensitive adhesive, and, the second band includes a surface layer of heat sealable polymer, a core layer of pressure sensitive adhesive and a layer of thermoplastic resin adjacent the layer. In the disclosed side-by-side coextruded film, the bands are alongside one another and the second band is the same thickness as the first band. The surfaces of the second band are shown as being co-planar with the surfaces of the first band. Each band extends from one surface of the side-by-side coextruded film to the other surface of the film. The film is folded upon itself and heat sealed to form a package by sealing jaws acting on the heat sealable polymer in the second band. When the heat seal is pulled apart, the heat seal layer ruptures through to the pressure sensitive adhesive and delaminates from it. The rupturing and delamination occur within the surface boundaries of the side-by-side coextruded film.

The approach disclosed in U.S. Pat. No. 5,382,472 is disadvantageous in several respects. It is limited in that the coextruded film can only be made by side-by-side coextrusion. Side-by-side coextrusion in turn is limited in that the side-by-side die is designed to run only certain resins. Even if it is designed to run a variety of resins, each die is configured to place the second band in a fixed location. To change the location of the second band, a new die is needed. To make adjustments within a given die to suit a resin or various resins is problematical and can result in surface non-uniformity of thickness of the first and second bands. Even a small difference in thickness of the second band will result in a raised area or hollow area along one side of the surface of a roll of the side-by-side coextruded film. To minimize this surface non-uniformity on a roll, roll size for shipments to customers will be kept relatively small. This will cause more frequent roll changes than desired.

Another approach which employs a tacky adhesive to provide an opening feature for a flexible package is that wherein an elongated cut is made through a packaging film. The cut is widened and a reclose tape wider than the cut and made of a substrate layer and a tacky adhesive layer is fed by a carrier system and applied with the tacky adhesive side down to the film to cover the open cut. The film is folded over on itself and pressed together without heat to adhere the tacky adhesive through the open cut to the opposite wall of the film. To open the package, the tape's tacky adhesive is pulled away from the opposite wall of the package.

This approach is disadvantageous because it requires that the tape's tacky adhesive layer be treated or covered with a removable release layer, or carried on a silicone coated paper carrier layer. These treatment systems and removable cover or carrier systems add steps, equipment and expense to produce the tape and package. Also, the oriented polyethylene terephthalate (PET) or polypropylene (PP) used as the substrate layer, are relatively expensive materials, cutting the film can effect the integrity and barrier properties of the film, and the seal obtained merely by pressing the adhesive against the film is not hermetic and has not been tamper evident.

It is an object of this invention to provide packaging materials, packages and methods which overcome the above and other problems and disadvantages existing in the art.

Accordingly, it is an object of this invention to provide an elongate multilayer flexible heat sealable, peelable and reclosable strip which is comprised of a tacky adhesive layer and which is suitable for being applied to a packaging film and heat sealed to it to form a package whose heat seal is manually readily openable and reclosable.

Another object is to provide packaging materials comprised of packaging films having the strip secured thereto, packages made from these packaging materials and methods for forming the same.

The elongate strip of this invention solves the above and other problems in the art. The strip which includes a layer of the sometimes odiferous tacky adhesive is thin, narrow and applied only where the opening and reclose feature is needed. Therefore, adhesive cost and objectionable odor problems are minimized. Since the strip includes one or more layers already covering the tacky adhesive layer, complicated steps involved in registering, aligning and applying a cover layer over or with the tacky adhesive layer, such as required in a coating process do not exist. Special treatment and removable cover or carrier systems are not required. Also, special and inherently limited side-by-side coextrusion dies and processes are not needed. Existing conventional equipment and processes can be employed for forming wide multilayer webs comprising the layer materials of the strip of this invention. The surface of a roll of strip cut from the web and wound on the roll will be uniform, and roll size in terms of linear feet of a strip will be at least the same, or greater than that of a roll of the packaging film to which the strip will be applied. The strip provides great flexibility of use. One or more strips can be applied at any desired location(s) on a packaging film and a strip can be adapted to be applied to many different packaging films and combinations of films having different surface layers, characteristics and requirements. Accordingly, the strips can be employed on a wide variety of films available from different suppliers. Packagers are not limited to using only side-by-side coextruded webs available from only limited suppliers. The strips and the packaging materials bearing the strips form packages whose heat seals are hermetic and can include tamper evident features.

The foregoing and other objects, features and advantages of this invention will be evident and further appreciated from the following description and accompanying drawings.

SUMMARY OF THE INVENTION

This invention is in a heat sealed, easy-opening and reclosable package, which comprises a packaging material comprised of a heat sealable base member material, and an elongate, multilayer, flexible, peelable and reclosable strip positioned between the surfaces of juxtaposed portions of base member material and comprised of an interior tacky adhesive layer, a first sealant layer comprised of a first heat sealable polymer disposed to one side of the tacky adhesive layer, and a second sealant layer disposed to the other side of the tacky adhesive layer and comprised of a second heat sealable polymer, the strip including a rupturable layer proximate the tacky adhesive layer, the base member material being heat sealed together along and by means of the strip whereat the sealant layers of the strip are heat sealed to the base member, said heat seal having sufficient initial seal strength to remain closed during handling of the package and yet being manually readily openable and reclosable.

The base member material can be heat sealed together including by each sealant layer being heat sealed to the same base member heat sealable surface, or by one of the strip sealant layers being heat sealed to one base member heat sealable surface and the other strip sealant layer being heat sealed to another heat sealable surface of the base member or of a base structure, which can be a container of flat base structure.

The rupturable layer preferably is comprised of an ionomer. The rupturable layer can be a sealant layer. The first and second sealant layers can each be an ionomer or comprised of a polymeric material selected from the group consisting of low density polyethylene (LDPE), linear low density polyethylene (LLDPE), very low density polyethylene (VLDPE), medium density polyethylene (MDPE), high density polyethylene (HDPE), ethylene vinyl acetate (EVA), ethylene acrylic acid (EAA), ethylene methacrylic acid (EMAA), ethylene methyl acrylate (EMA), olefins catalyzed by a single site catalyst, blends of these polymers with or without an ionomer, and heat seal coatings. Preferred sealant layers are comprised of EVA, LLDPE, blends of HDPE and EVA, HDPE and LLDPE and ionomer and EMA. The strip can include one or more layers between the tacky adhesive layer and the first and/or second sealant layer. Preferably the total thickness of the layer(s) to the side of the tacky adhesive layer is greater than the total thickness of the layer(s) to the other side of the tacky adhesive layer. Also preferably, all layers to the rupturable side of the tacky adhesive layer are as thin as possible while still obtaining the objectives of the invention, that is to obtain a sufficient bond strength during handling, yet seal strengths which provide for an easy-opening, peelable and reclosable strip heat seal. A layer of the strip can comprise a high tensile strength material whose tensile strength is higher than the tensile strengths of the other layers of the strip. A layer of the strip can include a material selected from the group consisting of a gas barrier such as EVOH, and an odor absorber such as a zeolite in an LDPE carrier resin.

The tacky adhesive layer can be a hot melt pressure sensitive adhesive comprised of a blend of from about 75 to 98 percent of a tacky adhesive and about 25 to 2 percent, preferably from about 20 to about 5 percent of a non-tacky but sealable polymer such as an ionomer which is the same as or compatible with the polymer material of the rupturable layer that is proximate the tacky adhesive layer. It is to be understood that the percentages of the composition components stated in the specification and the claims are on a by weight basis. For example, with respect to the adhesive, the percentages of the tacky adhesive component and of the non-tacky polymer component are based on the total weight of the adhesive. The blend in the strip provides a tamper evident whitened appearance when the strip of a package is initially opened. The tacky adhesive can be a hot melt adhesive which melts at from about 250° to 300° F., preferably at about 270° F. and is comprised of from about 60 to 99% preferably about 90% of a styrene isoprene copolymer and form about 1 to about 30%, preferably about 10%, of a tackifier which can be comprised of modified hydrocarbon having five carbon atoms. In a strip having such a tacky adhesive layer, the layers of the strip can be a first sealant layer which is the proximate rupturable layer and is comprised of LDPE, a second sealant layer of LDPE, and between the tacky adhesive layer and the second sealant layer there can be the following layers proceeding from the tacky adhesive to the second sealant layer: LDPE, a heat resistant adhesive, a polymer which is heat stable at from about 250° to about 300° F. and a heat resistant adhesive. Preferably, each heat resistant adhesive is comprised of a urethane adhesive, and the heat stable polymer is selected from the group consisting of polyesters, polypropylenes, polyamides and polycarbonates, and preferably is PET.

Preferred strips of the package are coextruded and include, a) a rupturable layer of ionomer, which is the first sealant layer, a second sealant layer comprised of an ionomer, a layer of EVA proximate the tacky adhesive layer between it and the second sealant layer, and a layer comprised of HDPE proximate the EVA layer, between it and the second sealant layer;

b) a rupturable layer of ionomer, a first sealant layer comprised of a blend of ionomer and EMA, preferably about 60 percent ionomer and about 40 percent EMA, proximate the rupturable ionomer layer, and a second sealant layer comprised of a blend of HDPE and EVA, preferably about 60 percent HDPE and about 40 percent EVA, proximate the tacky adhesive layer;

c) a rupturable layer of ionomer wherein the first sealant layer is proximate it and is comprised of EVA, and the second sealant layer is comprised of a blend of EVA and HDPE;

d) a first sealant layer comprised of EVA, a second sealant layer comprised of a gel lacquer heat seal coating, and between the tacky adhesive layer and the second sealant layer there is a layer comprised of a blend of HDPE and EVA; and e) a layer to one side of the tacky adhesive layer which includes a first colorant and a layer to the other side of the tacky adhesive layer which includes a second colorant which is distinguishable from the first colorant, the colorants providing a visible tamper evident color contrasting effect in the strip heat seal area of the package when the heat seal is reclosed, which color effect is different from the color of the heat seal before it is initially opened.

f) the first sealant layer is the rupturable layer and is an ionomer, the second sealant layer is the comprised of LLDPE, and from the tacky adhesive layer to the second sealant layer, there is a layer comprised of EVA and a layer comprised of LLDPE.

Preferably, one strip sealant layer, desireably the second sealant layer, as when it is not the rupturable layer, is heat sealed to one heat sealable surface of the base member or base structure by a heat seal that is wider than the width of the strip, and the other strip sealant layer is heat sealed to same or another heat sealable surface of the base member or of the base structure by heat seal which is narrower that the width of the strip. The strip can be secured to a base member material at, adjacent or near, preferably within two or three inches of a margin (understood to include a fold line) of the base member material, and preferably the strip is closer to a margin of the member than another easy opening feature is to that margin. When the base member for exammple is lidstock or an impression for forming a package or lidstock, the width of the strip can cover up to about one half of the surface area of the impression, or of the heat sealable surface area or cavity of the container.

The packaging material includes base member material which is bonded to a semi-rigid substrate, or is lidstock or is suitable for use as lidstock, which can be heat sealed strip side down to a heat sealable surface, for example a flange or lip of a container. The base member can be a single member, or separate panels of the same, or of different base member materials. The base member material preferably is flexible, including semi-rigid, and it can be single or multiple layered, e.g. packaging sheet or film, having one or two heat sealable surfaces.

Preferred packages of the invention include those wherein:

a) the first sealant layer is comprised of an ionomer, and the second sealant layer of LLDPE is heat sealed to the surface of a base member material heat sealable inner layer of a linear alpha-olefin copolymer synthesized with a methalocene single site catalyst;

b) each of the first sealant layer of ionomer, and the second sealant layer of LLDPE is heat sealed to the surface of a base member material heat sealable inner layer of a linear alpha-olefin copolymer synthesized with a metallocene single site catalyst;

c) the strip first sealant layer and second sealant layer are each comprised of ionomer, and the base member is a multilayer flexible packaging film whose first heat sealable layer is comprised of ionomer and which can include a heat stable polymer layer;

d) the base member is comprised of from inner layer to outer layer, a heat sealable layer comprised of an EVA or an olefin catalyzed by a single site catalyst, adhesive, EVOH, adhesive, a blend of HDPE and LLDPE, print, and LDPE;

e) the base member is as described immediately above, and for example, the strip first sealant layer, e.g. a blend of ionomer and EMA is heat sealed to the EVA or to the olefin layer of the base member, and the second sealant layer blend of HDPE and EVA is heat sealed to the LDPE of the base member; or f) the base member has an easy opening feature in addition to the strip, and the strip is positioned closer to a margin of the base member than the easy-opening feature is to that margin.

BRIEF DESCRIPTION OF THE DRAWINGS

FIG. 11 also shows an unfilled package of this invention.

FIG. 14 also shows filled and unfilled packages of this invention.

DETAILED DESCRIPTION

Figure 1:
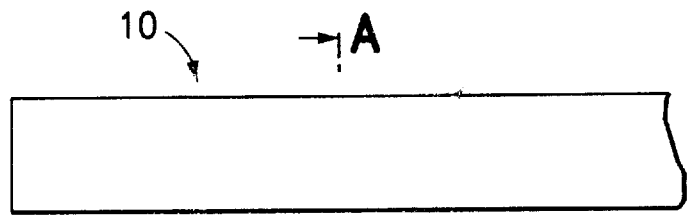
FIG. 1 is top plan view with a portion broken away showing a strip of this invention.
Figure 2:
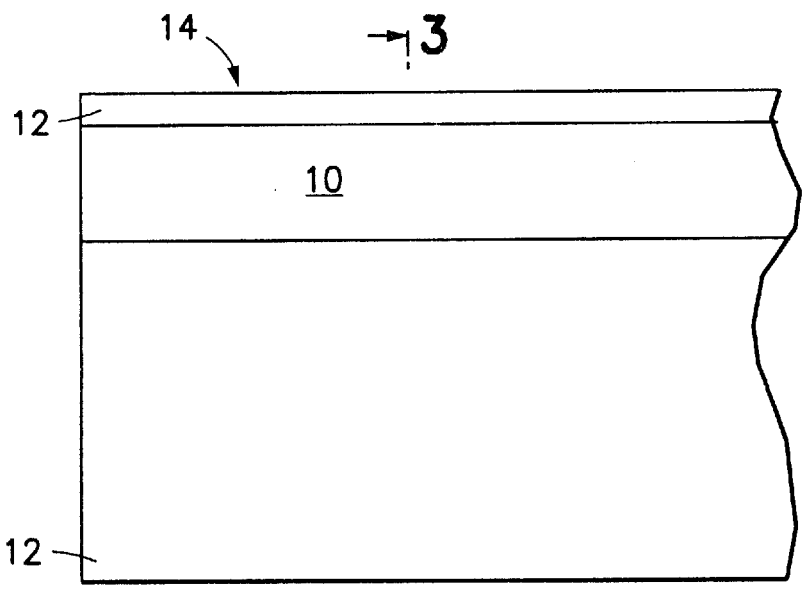
FIG. 2 is a top plan view of a packaging material comprised of a packaging base member having the strip of FIG. 1 secured thereto.
Figure 3:
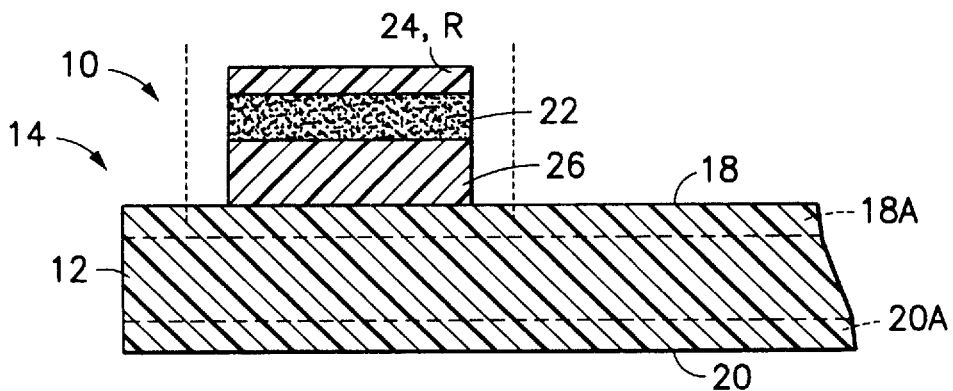
FIG. 3 is a vertical section with a portion broken away taken along line 3—3 of FIG. 2.

FIG. 1 is a top plan view showing a portion of the elongate, heat sealable, multilayer, flexible, peelable and reclosable strip of this invention, generally designated 10. The strip is comprised of plastics materials and is suitable for being secured to a base member material, generally designated 12, to form a packaging material, generally designated 14. The packaging material having a strip secured thereto as shown in FIGS. 2 and 3, is suitable for forming a package, generally designed 16 (FIGS. 4 and 5) having a heat seal along the strip and which is manually readily openable and reclosable. As shown in FIG. 3, base member material 12 has at least one sealable, preferably heat sealable, surface 18, whether the base member be a single layer as shown, or multilayered and having a layer 18A (upper dashed line). The base member can have another or a second sealable or heat sealable surface 20 of a base member which is a single layer, or of a layer 20A (lower dashed line) of one which has multiple layers. FIG. 3 shows one embodiment of strip 10 comprised of an interior tacky adhesive layer 22, a first sealant layer 24 disposed to one side of the tacky adhesive layer and preferably comprised of a heat sealable polymer, and a second sealant layer 26 disposed to the other side of the tacky adhesive layer and preferably comprised of a second heat sealable polymer.

Figure 4:
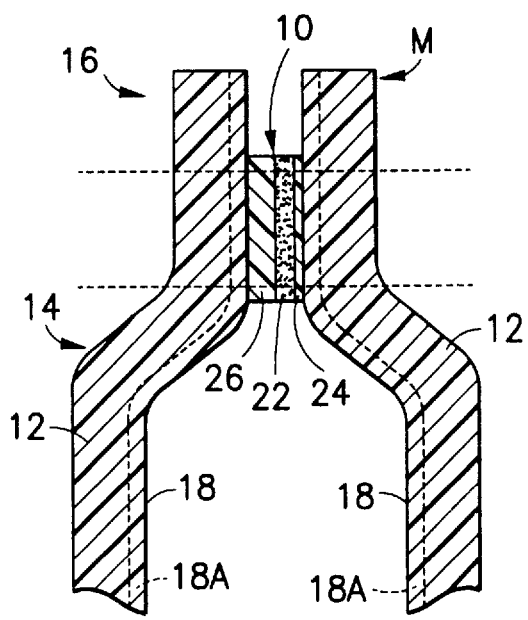
FIG. 4 is a vertical section with portions broken away of a package formed of a packaging material as in FIG. 3 folded over on itself and heat sealed together along a strip of this invention.
Figure 5:
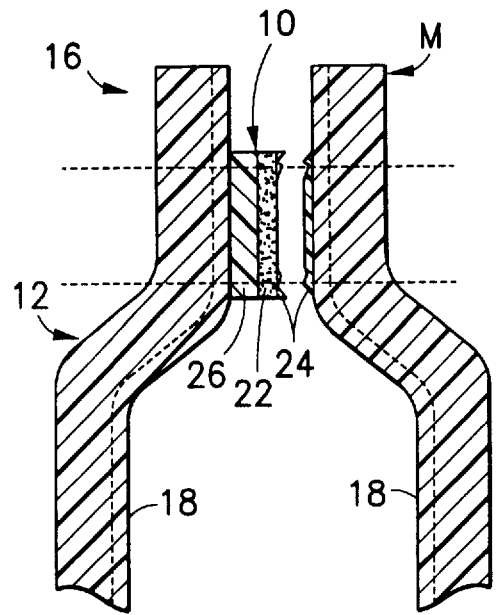
FIG. 5 is a vertical section as in FIG. 4 showing the package of FIG. 4 opened through the strip.

Strip 10 includes, that is, one of the layers of the strip is, a rupturable layer proximate to tacky adhesive layer 22. The rupturable layer can be proximate either side or both sides of tacky adhesive layer 22. Preferably, the rupturable layer is on only one side of the tacky adhesive layer, and preferably it is a thin layer. In FIGS. 3–5, first sealant layer 24 is the rupturable layer. Each sealant layer 24, 26, is a surface layer of the strip and is compatible with, that is, it is suitable for being secured or heat sealed to the surface of the base member to which the sealant layer is to be secured or heat sealed. FIG. 3 shows that preferably second sealant layer 26 is secured, preferably by a heat seal, to a surface 18 of base member 12. The width of the heat seal of the strip to one surface of the base member, represented by the spaced dashed vertical lines, preferably is wider than the width of the strip to assure that the entire width of the strip is secured to the base member. Although FIG. 3 shows each sealant layer proximate to the tacky adhesive layer, one or more other layers can be included in the strip between tacky adhesive layer 22 and either or both sealant layers 24,26.

As shown in FIGS. 4 and 5, strip 10 enables base member 12, or packaging material 14, to be heat sealed along and by means of the strip to form a package 16. In FIG. 4, base member 12 forms a cavity which may or may not contain product, and first sealant layer 24 is sealed, preferably heat sealed, to surface 18, or 18A, adjacent or near a margin M of an overlapped portion of base member. FIG. 4 shows that the width of the heat seal of first sealant layer 24 to base member surface 18 and of the overlapped portions of base member along and by means of the strip to form the package, as represented by the spaced, dashed horizontal lines, is preferably narrower than the width of Strip 10. This is to assure that the heat seal of the strip to both juxtaposed portions of the base member is not wider than the strip since this would seal both base members directly together. Opening the package would require tearing through the latter heat seal prior to pulling apart layers of the heat sealed strip. The heat seal of package 16 has sufficient initial bond strength to remain closed during handling and yet, as shown in FIG. 5, it can be manually readily opened and reclosed. That is, the heat seal can be manually readily pulled apart to initially open the package, rupturable first sealant layer 24 being ruptured and pulled apart from tacky adhesive layer 22 to leave a surface of tacky adhesive material exposed along the opened area of the strip. Strip 10 allows package 16 to be reclosed by the application of manual pressure upon a portion of the package against exposed tacky adhesive.

First and/or second sealant layers 24,26 can be comprised of any sealable, preferably heat sealable (hereafter referred to as "heat sealable") polymer material suitable for use as a sealant or heat sealable layer of a packaging material. "Heat sealable" herein means sealable or bondable by heat however obtained, for example, by induction, or by magnetic ultrasonic, radio frequency, light, laser or other energy sources which cause the materials to bond, fuse or otherwise seal. Such heat sealable materials usually are thermoplastic film-forming polymers, are well known in the art, and desirably include ethylene polymers and copolymers, and copolymers of ethylene and an ethylenically unsaturated commonomer selected from the group consisting of carboxylic acids and esters, salts and anhydrides thereof. Examples of suitable polymers are ionomers and sealant materials comprised of a polymeric material selected from the group consisting of low density polyethylene (LDPE), linear low density polyethylene (LLDPE), very low density polyethylene (VLDPE), medium density polyethylene (MDPE), high density polyethylene (HDPE), ethylene vinyl acetate (EVA), ethylene acrylic acid (EAA), ethylene methacrylic acid (EMAA), ethylene methyl acrylate (EMA), olefins catalyzed by a single site catalyst, blends of these polymers with or without an ionomer, and heat seal coatings. Although LLDPE includes VLDPE and VLDPE includes ultra low density polyethylene (ULDPE), LLDPE and VLDPE are listed separately herein for clarity. Heat seal coatings for example, gel lacquer ones, are suitable for being heat sealed to polyesters, polypropylenes, polyamides, polycarbonates, vinyl chloride polymers, vinylidene chloride polymers, and styrene polymers and copolymers. Heat seal coatings (HSC) are routinely used in the flexible packaging industry as a way to form a heat seal between packaging members that are otherwise not sealable. For example, various HSC's can be used to seal aluminum foil as lidstock to cups or bowls comprised of PET, polystyrene (PS), polyvinylidene chloride (PVC) and other materials. HSC's are often composed of chemically modified EVA's that are subsequently dissolved in an appropriate solvent. Most HSC's are applied to a packaging web from a solvent or water base by a rotogravure cylinder on a standard printing or coating line, followed by drying before winding. Other methods of application include roll and wire-wound rod coating. HSC coatings can be applied continuously or in register. Typical coating thickness is about 0.1–0.5 mil.

Each sealant layer must be compatible with the layer to which it is going to be sealed or heat sealed. Thus, when the base member surface(s) or surface layer(s) to which the sealant layer to be heat sealed comprises an ionomer, then the sealant layer preferably comprises ionomer. When the base member heat sealable surface is not comprised of ionomer, then the sealant layer preferably does not comprise ionomer. When a sealant layer is the rupturable layer, then the preferred rupturable sealant layer material is comprised of ionomer. Ionomers, sometimes referred to as ionic polymers or ionic copolymers, are commercially available from different manufacturers and commonly used to form heat sealable layers in flexible packaging materials. Ionomers are known to be comprised of an a-olefin and an $\alpha$-$\beta$-ethylenically unsaturated carboxylic acid having 1 to 2 carboxylic acid groups and having at least 10 percent of the carboxylic acid neutralized by one or more metal ions. The $\alpha$-olefins have the general formula $RCH=CH_2$, where R is either a hydrogen or an alkyl group having preferably from 1 to 8 carbon atoms, for example ethylene. The concentration of the $\alpha$-olefin is at least 50 mole percent in the copolymer and is preferably greater than 80 mole percent. The $\alpha$-$\beta$-ethylenically unsaturated carboxylic acid group containing monomer preferably has from 3 to 8 carbon atoms, for example, acrylic acid, methacrylic acid, ethacrylic acid, itaconic acid and maleic acid. Suitable ionomers are disclosed in U.S. Pat. Nos. 3,264,272 and 3,355,319 and are commercially available, for example from E.I. du Pont de Nemours and Company under the trademark SURLYN. Examples of olefins catalyzed by a single site catalyst are ethylene polymers, for example, linear ethylene alpha olefin copolymers synthesized by a metallocene catalyst and commercially available from Exxon Chemical Company under its trademark EXACT.

Aside from ionomers, preferred sealant layer materials which can be employed include EVA, EMA, low and linear low density polyethylenes and blends of HDPE with EVA or with EMA. Preferably the strip includes a polymer which provides tensile strength to the strip to facilitate handling and securing the strip to the base member material. Accordingly, it is desirable to include a layer of for example HDPE or a blend including HDPE.

FIG. 3 shows an example of an embodiment of a strip of this invention where the first sealant layer 24 is the rupturable layer R and is comprised of ionomer, and the second sealant layer 26 is comprised of ionomer. This strip is suitable for being heat sealed to a base member having at least one ionomer surface layer. When the rupturable layer is comprised of an ionomer and the strip is to be heat sealed to a non-ionomer surface or layer of a base member, the sealant layer proximate the ionomer rupturable layer can be an operable blend of an ionomer and a non-ionomer olefin which is compatible with the non-ionomer heat sealable surface of the base member material to which the sealant layer is to be heat sealed. Alternatively, a sealant layer can be employed proximate or adjacent the rupturable ionomer layer, preferably a sealant layer comprised of a non-ionomer, or an operable blend of an ionomer and a non-ionomer, wherein in each case the non-ionomer is compatible with the non-ionomer heat sealable surface(s) of the base material to which the sealant layer is to be heat sealed. These concepts are demonstrated by embodiments of a four layer strip shown in FIG. 6.

Figure 6:
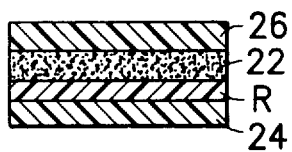
FIGS. 6–10 are vertical sections as would be taken along line A—A of the strip of FIG. 1, showing various embodiments of the strip, FIG. 6 showing one having four layers, FIG. 7 five layers, FIG. 8 seven layers, FIG. 9 five layers and FIG. 10 seven layers.

FIG. 6 shows a four layer strip wherein in a preferred embodiment, the rupturable layer R is an ionomer, the first sealant layer 24 is EVA, and the second sealant layer 26 is a blend of HDPE and EVA. In a second embodiment represented by the four layer strip of FIG. 6, the rupturable layer R is an ionomer, the first sealant layer 24 is a blend of ionomer and EMA, and the second sealant layer 26 is a blend of HDPE and EVA. In a third embodiment, the rupturable layer R is ionomer and the first and second sealant layers 24, 26 are EVA. In a fourth embodiment, the layers are the same as for the third embodiment except that the second sealant layer 26 is LLDPE.

Figure 7:
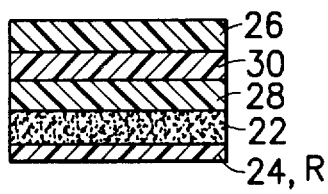

FIG. 7 shows an example of an embodiment of the strip having five layers. The first sealant layer 24 is the rupturable layer R and is comprised of ionomer, the second sealant layer 26 is comprised of ionomer, and between the tacky adhesive layer 22 and the second sealant layer there is a layer 28 of EVA proximate the tacky adhesive layer, and a layer 30 of HDPE. The bond strength between the HDPE and EVA layers and between the EVA and tacky adhesive layers causes rupturing to occur through thin rupturable first sealant ionomer layer 24.

In another embodiment of a five layer strip, rupturable layer 22 is ionomer, the first sealant layer 24 is comprised of an EVA, the second sealant layer 26 is a gel lacquer heat seal coating, and between the tacky adhesive layer 22 and the second sealant layer, there is a layer of a blend comprised of HDPE and EVA. The gel lacquer heat seal coating renders the strip heat sealable to base member surface layer materials such as polyesters, polypropylenes, polyamides and polycarbonates which are heat sealable to the coating but are not typically considered heat sealable to many conventionally heat sealable materials, including in this instance the blend of HDPE and EVA which bears the coating.

FIG. 7 shows there can be one or more layers between the tacky adhesive layer and the second sealant layer. This also applies to providing one or more layers between the rupturable layer and the first sealant layer. Further examples of this concept are shown in FIGS. 8, 9 and 10.

Figure 8:
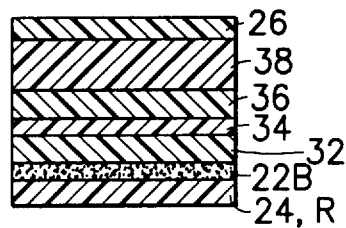

FIG. 8 shows an embodiment of the strip having seven layers. The first sealant layer 24 is the rupturable layer R and is comprised of LDPE, the second sealant layer 26 is comprised of LDPE, and between the tacky adhesive layer 22 and second sealant layer, there are the following layers proceeding from layer 22 to the second sealant layer: 32, LDPE; 34, a heat resistant adhesive, for example a urethane adhesive; 36, a polymer which is heat stable at from about 250° F. to about 300° F., is selected from the group consisting of polyesters, polypropylenes, polyamides, and polycarbonates, and preferably is polyethylene terephthalate (PET); and 38, a heat resistant adhesive, for example a urethane adhesive. Tacky adhesive layer 22 is a high melt temperature hot melt adhesive comprised of about 90 percent of a styrene isoprene copolymer and about 10 percent of a modified hydrocarbon having about five carbon atoms. Because of the strong bond strengths between the layers 32 through 38, they will effectively function as one thick layer and rupturing will occur through the LDPE layer 24, R even though it is as thick as some of these individual layers.

The strip of the invention can include one or more layers provided to impart desirable characteristics to the strip and resulting package. For example, because tacky adhesive materials tend to give off objectionable odors, one or more layers of the strip can include a material selected from the group consisting of a gas barrier and an odor absorber to reduce the passage of these objectionable odors and reduce the apparent odor level of packages made from packaging film, strips and structures which include a tacky adhesive layer. Any suitable gas barrier layer or material can be employed, for example, preferably an extrudable resin such as an ethylene vinyl alcohol copolymer, a polyamide or a polvinylidene chloride (PVdC) polymer. Any suitable odor absorber can be employed. Such materials are known in the art. A preferred material is an extrudable olefinic, e.g. LDPE, carrier resin in which there is dispersed an oxygen gas absorbing zeolite. These materials can be employed alone or in combination in or as one or more layers of the strip. Examples of such strips are shown in FIGS. 9 and 10.

Figure 9:
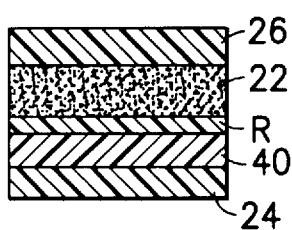
Figure 10:
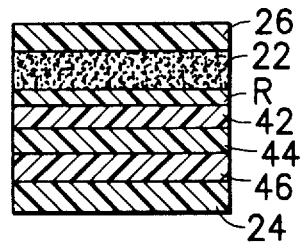

FIG. 9 shows an embodiment of a five layer strip comprised of a tacky adhesive layer 22, a rupturable ionomer layer R, a first sealant layer 24 of LLDPE which can include an anti-block, a second sealant layer 26 of a blend of EVA and LLDPE, and between layers R and 24 a layer 40 of LLDPE which includes and oxygen absorber.

FIG. 10 shows a seven layer strip whose layer materials are the same as in FIG. 9, except that between the rupturable ionomer layer R and the first sealant layer 24 there are the following layers, an adhesive layer 42 comprised of a blend of about 50% LLDPE and about 50% of a maleic anhydride modified LLDPE, an EVOH oxygen barrier layer 44 and another layer 46 of the adhesive blend. Preferably, the materials added to the strip to provide enhanced characteristics are added to or comprise layers other than the tacky adhesive layer and the rupturable layer. Other materials which can be added to a layer of the strip are oxygen scavenging, moisture absorbers or desiccants, and colorants. These materials are known as the art. Examples of suitable oxygen scavengers are disclosed in U.S. Pat. No. 4,536,409. Examples of suitable desiccants are disclosed in U.S. Pat. No. 4,407,897. The disclosures of these references are incorporated by reference.

The strip of this invention can be adapted to provide a tamper evident feature to a package by providing characteristics of or features in the strip which provide one effect when the heat seal is unbroken and another color effect when and after the heat seal is partially or fully broken or pulled apart. One approach is to provide a first colorant, preferably substantially opaque e.g. dark, in a layer to one side, preferably the non-ruptured side, of a transparent tacky adhesive layer, and a second colorant of a distinguishable or noticeably different color or shade, e.g. a lighter color and which is at least partially and preferably is substantially transparent, in a layer to the other side, preferably the ruptured layer side of the tacky adhesive layer. Alternatively, one of the colorants can be included in the tacky adhesive layer and the other in, or in a layer to the side of, the rupturable layer which is pulled apart from the tacky adhesive layer. With either approach, upon reclosure of the strip, there will be apparent at least one of at least three readily visually noticeable tamper evident color contrast effects.

One is that there will be one color effect, e.g. the shade of a blend of the first and second colors visible where any portion of rupturable layer material 24,R remains on the tacky adhesive layer 22, for example, as shown in FIG. 5. Another effect will be the appearance of the lighter color of the rupturable layer material wherever that layer is not completely or fully pressed and resealed against the tacky adhesive layer material. There are two heat seal areas where this will occur. One is generally along what was the exposed tacky adhesive surface. Because the adhesive layer material surface will have a roughened texture (with elevated areas and depressed areas) after the layers are pulled apart, some or many of these tiny depressed areas will not be fully contacted and resealed by the rupturable layer when it is pressed against the roughened surface. In these depressed areas, there will be tiny pockets of trapped air and they will be scattered generally along the tacky adhesive reclose surface area. At these areas where the rupturable layer is not fully resealed against the tacky adhesive, the color of the lighter rupturable layer will be readily visible against the opaque contrasting dark color background. The amount or surface area or rupturable layer color visible indicates the effectiveness of the reclosure. As to the other heat seal area where there will be a visible color effect, because the upper marginal edge portion of the rupturable layer or layers will be stretched and permanently deformed in the heat seal area of the strip when and where the heat seal is pulled apart, upon reclosing the strip, it will be impossible to completely align the stretched ruptured layer or layers with the remaining unstretched exposed area of tacky adhesive. Therefore, portions of the stretched areas of reclosed film will be misaligned and the color of the ruptured layer material or materials at these and any other misaligned areas will be readily visible. Misalignment because of stretched rupturable material usually occurs beyond the upper margin or boundary edge defining the heat seal of the rupturable layer to the tacky adhesive.

The tacky adhesive material which comprises the tacky adhesive layer of the strip can be any suitable tacky adhesive. Preferably, it is coextrudable. Generally, the tacky adhesive is one which forms a seal, preferably a hermetic seal wherein the seal or bond is resealable by the application of manual pressure alone at room temperature. The term tacky adhesive includes pressure sensitive adhesives which are blends of an elastomer and a tackifier. The tacky adhesive can include from about 40 to 90 percent, preferably about 40 to 80 percent, of an elastomer and about 10 to 60 percent, preferably about 20 to 60 percent, of a tackifier such as a hydrocarbon and or terpene tackifier. The adhesives can include for example up to about 15 percent of other components or additives such as fragrances providers, antioxidents and oils.

The tacky adhesive provides a bond or seal strength to its proximate layers such that the seal of the package formed by the strip is sufficient to remain closed during handling and yet allows a proximate layer of the strip to be pulled apart from the tacky adhesive layer to expose tacky adhesive and open the package. The adhesive has a reseal strength which allows the package to be reclosed by the application of manual pressure upon a portion preferably of the strip area of the package against exposed tacky adhesive.

Examples of suitable materials which can be used to comprise the tacky adhesive layer of the strip include styrene copolymers, for example, styrene isoprene copolymers sold under the respective trade designations: M3062 by Findley Adhesives Inc., HL2021 by H.E. Fuller Company, and KRATON by Shell Chemical Company. The tackifier may be any suitable tackifier conventionally used with elastomers to form tacky or pressure sensitive adhesives. Examples of suitable tackifiers include terpene resins, such as those sold under the respective trademarks PICOLASTIC by Hercules, Inc., ZONTAC by Arizona Chemical Company, and hydrocarbon resins sold under the respective trademarks: NEVEX by Neville Chemical Company, and ESCOREZ by Exxon Chemical Company.

The tacky adhesive employed as the tacky adhesive layer of the strip can be a blend of a tacky adhesive and a non-tacky component which is the same as or compatible with the material of the proximate rupturable layer such that when the heat seal of the package by means of the strip is pulled apart, some of the common or compatible component material at or near the surface of the adhesive layer is pulled away from the tacky adhesive component thereby leaving exposed tacky adhesive material for reuse. This type of blend is advantageous because it reduces the cost of the costly tacky adhesive material, reduces the likelihood of stringing and provides a tamper evident whitening of the adhesive during cohesive failure when the heat seal is pulled apart. The blend composition can be between about 75 to about 98 percent, preferably about 85 to about 90 percent tacky adhesive, and from about 2 to about 25 percent, preferably about 10 to about 15 percent of non-tacky component. Above 20 percent of the non-tacky component, the adhesive tends to increasingly have less than the desired tackiness. A suitable blend for use with an ionomer or ionomer-containing rupturable layer whether or not it is a sealant layer, is a blend of about 90 percent tacky adhesive and about 10 percent ionomer.

Tacky adhesives which can be utilized for strips employed with base member materials which are or have a heat stable layer such as a polyester, polypropylene, polyamide or polycarbonate, are high melt temperature tacky adhesives which melt and are applied at temperatures ranging from about 250° F. to about 300° F. These tacky adhesives can be comprised of from about 60 to 99% of a styrene copolymer, preferably about 90% of a styrene isoprene copolymer, and about 1 to about 30% of a tackifier, preferably about 10% of a tackifier comprised of a modified hydrocarbon having five carbon atoms. These high melt temperature tacky adhesives can be applied to the heat sealable surface of packaging structures having a heat stable layer such as to the LDPE layer of the PET containing five layer laminate used to form the seven layer structure shown in FIG. 8.

Although the tacky adhesive preferably is coextrudable and coextruded, it can be applied to a layer to be proximate to it by any suitable method, such as adhesive lamination, rotogravure, flexographic or silk screen printing, rod, spray or particle coating, or vacuum deposition. Other than coextrusion, direct rotogravure application is preferred.

The thickness of the tacky adhesive layer can be any suitable thickness. The thickness is to be sufficient to heat seal and reseal the strip in accordance with the invention and yet it is as thin as possible for economic reasons. Coextrudable tacky adhesives may require greater thickness than lamination-applied ones to generate the same level of tackiness. Preferably, the thickness of the tacky adhesive layer is between about 0.1 and about 2.0 mil (2.5 to and 51 microns), more preferably between about 0.5 and about 1.5 mil (12.5 and 30.5 microns).

The rupturable layer proximate the tacky adhesive layer, preferably is comprised of an ionomer and preferably it has a low to moderate elongation. The rupturable layer proximate the tacky adhesive layer is thick enough to maintain sufficient seal strength of the heat seal during handling and yet it is as thin as possible to cause it to rupture through to the tacky adhesive layer, delaminate from it and expose tacky adhesive when the heat seal is pulled apart. When the rupturable layer is coextruded, preferably it is from about 0.05 mil to about 1 mil. The higher values approaching 1 mil thickness are relevant for example when the rupturable layer is highly bonded to another layer (not the tacky adhesive layer) such that these bonded layers tend to act as one and the other layer may rupture as well. When the rupturable layer is laminated, preferably it is from about 0.5 mil. to 1 mil thick. The rupturable layer thickness may exceed these ranges for example when the interlaminar bond strengths and thicknesses of the layers to the opposite side of the tacky adhesive layer are sufficiently great that relative to the thickness and bond or seal strength of the rupturable layer, the rupturable layer will rupture and delaminate.

Preferably the layers to the rupturable side of the tacky adhesive layer are as thin as possible while still obtaining the desired seal and bond strengths during normal handling, opening and reclose. The relative thicknesses of the layer to the rupturable side of the tacky adhesive are such that rupturing occurs in the rupturable layer and delamination occurs as previously described between it and the tacky adhesive layer. Some delamination also can occur between the tacky adhesive layer and its other proximate layer and there can be cohesive failure in the adhesive layer itself.

It is understood that to achieve the desired rupturing of the rupturable layer and the desired delamination between it and the tacky adhesive layer, the bond or seal strengths between the other layers of the strip and between the strip and the layer or layers to which the strip is sealed or heat sealed are sufficiently greater than the strength required to tear or rupture the rupturable layer.

The strip can be of any suitable thickness. Although the overall thickness of the strip will depend for example on the width of the strip, its application and the nature and use of the base member and package to be formed, the preferred thickness is between about 2.0 mil; to about 5 mil, most preferably about 3.5 mil especially for narrow width strips. Generally, strips thinner than about 2 mil tend to be too soft to handle without a support such as a release film or an endless band. Including a high tensile strength material or layer permits thinner strips than otherwise.

Although the width of the strip will vary depending basically the same factors as does the thickness, generally the width can range from the minimum width which is handleable to up to a third or even half of the surface area of the base member or package panel on which it is applied. For most applications, the preferred width is from about ⅛ inch to about 3 inches, more preferably from about ⅜ to ¾ inch, and most preferably about ½ inch. Wider strips are applicable for example when the base member or packaging material to which the strip is applied is to be used for a large package or for as lidstock for a large container with a wide flange, or on say a cylindrical container where the strip and easy opening reclosable feature is to provide half of a full open access to and reseal of the container.

The strip of the invention can be formed by any suitable method. Preferably, the strip is coextruded. It can be coextruded by any coextrusion process. The preferred method is to use a tubular die to coextrude an air-cooled tube of multilayer flexible material comprised of the layers which are desired to comprise the strip. The coextruded tube is cut open, wound up flat, then unwound and slit preferably in the machine direction into one or desirably a plurality of endless or elongated strips which are wound onto one or more rolls. From the rolls, one or more strips can be applied or secured directly in line to an endless or elongate base member material. The strip can also be formed for example by any suitable lamination process. For example, the seven layer strip of FIG. 8 can be formed by an adhesive lamination process wherein one side of a 0.5 mil PET layer is coated (4 pounds per ream) with a thin layer of isocyanate-cured urethane adhesive (commercially available from Novocote International under the trademark ZENECA). Solvents are driven from the adhesive and the coated PET layer is laminated to a 0.6 mil layer of LDPE. Another thin coating of the urethane adhesive is applied to the other side of PET layer, solvents are driven off, and another layer of 0.6 mil LDPE is applied to the adhesive coated side of the PET layer. A 2000 foot long five layer laminate web was thereby formed and its adhesive layers were cured for one week. A 1.3 mil coating of high temperature hot melt tacky adhesive layer comprised of 90% styrene isoprene copolymer (commercially available from Fuller under the trade designation HL2021) and about 10% of a modified hydrocarbon tackifier (commercially available from Neville Chemical Company under its trademark NEVEX) is applied by rotogravure at about 270° to one of the LDPE layers of the five layer web. Then another layer of 0.6 mil LDPE is laminated to the tacky adhesive layer. The resulting seven layer lamination was 24 inches wide and was wound on a roll and slit into strips from about ½ to 1 inch wide.

When the strip is secured as by heat sealing to a base member material as in FIG. 3, the base member material bearing the strip is a packaging material, generally designated 14, which, for example, when heat sealed to itself or to a container, is suitable for forming a heat sealable, easy opening, reclosable package of the type disclosed herein. One of the strip sealant layers is secured to the base member thereby enabling the base member to be heat sealed along and by means of the strip to form a package whose heat seal thereat is easy-opening and reclosable as described. The base member material is flexible, meaning it can be semi-rigid. The base member can be any single layer or multiple layer packaging sheet or film having at least one, sometimes herein called a first, heat sealable surface, although each of its surface layers may be heat sealable, in which case it is described herein as also having a second heat sealable surface.

The strip sealant layer materials and the base member heat sealable layer(s) are selected to be compatible and combined as desired for forming the ultimate heat seal and package desired. The sealant layer which is secured to the heat sealable surface of the base member must be heat sealable to that surface, and the other sealant layer must be heat sealable to the base member surface to which it will be heat sealed. The packaging material includes all possible embodiments of a sealant layer of the strip being secured to a base member heat sealable surface, including those wherein the first sealant layer is secured to the base member first or second heat sealable surface, and those wherein the second sealant layer is secured to the second heat sealable surface. Thus, the packaging material includes embodiments wherein one strip sealant layer is heat sealable to one heat sealable surface and the other sealant layer is heat sealable to the other heat sealable surface, and those wherein one sealant layer is heat sealable to each base member heat sealable surface.

Preferably, the strip sealant layer which is first secured to the base member is the one that is on the side of the tacky adhesive layer that is opposite to the side having the rupturable layer. One reason is that sealant layer, herein non-limiting but usually referred to as the second sealant layer, is usually the thicker side of the strip and is considered the backing of the strip.

Securement of the strip to the base member to form the packaging material can be by any suitable means which will maintain the strip substantially in a position such that the strip will be in the position desired when the strip is finally heat sealed to form the package. As non-limiting examples, the strip can be held to the base member by static electricity, or by spot, patterned, linear or general bonding, or fused, welded or otherwise sealed by any suitable source of heat. As discussed in connection with FIG. 3, the preferred method of securing the strip to a base member to form a packaging material is by heat sealing (herein sometimes called first heat sealing step), preferably with or by a heat seal which is wider than the width of the strip.

The strip can be secured to the base member material at any suitable location, including at, adjacent or near, preferably within two or three inches of a margin (understood to include a fold line) of the base member material. When the base member already has or is to have another an easy-opening feature, preferably the strip is closer to a margin of the member than the easy opening feature is to that margin. When the base member is an impression for forming a package or lidstock for closing a package, the width of the strip secured to the member can be wider and generally can be sufficient to cover up to about one half of the surface area of the impression.

The packaging material includes base member materials which are rigid but which preferably are flexible and includes materials which have a semi-rigid layer and/or are bonded to a semi-rigid substrate. The packaging material includes base member materials suitable or adaptable to be suitable for use as lidstock, which is defined herein as material for making a lid including a closure or cover of any type, and lidstock includes lids, closures, covers and overlays of various types. The lidstock can be heat sealed strip side down to a heat sealable surface, for example to a flange or lip of a container.

Base member material is herein understood to mean and broadly include the base member material on which a strip is to be or secured, and it includes base member material which is formed into a package. The base member material can be any suitable material made by any suitable process. Base member material can be a single base member (e.g. folded back on itself), or separate pieces, sections or panels of (e.g. cut from) the same base member material, or of different base member materials (e.g. two base member materials, one having certain layers, and the other having different layers). The thickness of the base member materials can be the thickness of any suitable single or multilayer flexible or semi-rigid packaging film or sheet. Depending on the materials of which films are made, films can have thicknesses ranging from about 1.5 to about 6 mils. Generally they are about 3 mils thick. Semi-rigid sheets are considered to be those that are thicker than about 6 mils. However, if they contain materials that have high stiffness, they can be thinner and can range from about 4 mils or more to about 9 mils.

The packaging materials include base member materials disclosed herein and having secured thereto one or more of the strips disclosed herein, whether or not they are then or later heat sealed to form a package. These strips include but are not limited to those having one or more ionomer sealant layers secured to one or more base member ionomer surface layers, and strips having one or more sealant layers comprised of a blend of ionomer and EMA, a blend of HDPE and EVA or a blend of EVA and LLDPE.

The method of forming a heat sealed, easy-opening, reclosable package in accordance with this invention comprises providing heat sealable base member material, providing an elongated multilayer, heat sealable, flexible, peelable and reclosable strip, bringing the base member material into an overlapping or juxtaposed relationship so that at least one heat sealable surface of base member material is on each side of and faces the strip, and heat sealing the base member material along and by means of the strip to thereby form a package, whose strip provides the easy opening, peelable, reclosable heat seal and features disclosed herein. The method includes two basic approaches to securing and/or heat sealing the strip to the base member material. The first is a two-step approach wherein the strip is first secured to base member material by any suitable means including by a first heat sealing step to form a packaging material as previously described herein, and then heat sealing the packaging material, for example to itself, or a base structure along and by means of the strip to thereby form the package filled or unfilled. The second approach is a one-step approach wherein there is not first step of securing the strip to base member material. Base member material is brought into an overlapping relationship by whatever manner so that at least one heat sealable surface of base member material is on each side of and faces the strip, and the base member material is heat sealed along and by means of the strip to thereby form the package. Each approach can be employed on base member material as previously defined herein. Thus, base member material to which the strip is secured and/or heat sealed to form a packaging material or package can be comprised of one or a single base member which is, for example folded back upon itself and heat sealed along the strip to one or each surface of the base member to form a package, Or base member material can be comprised of two separate pieces or sections (herein sometimes collectively referred to as panels) of the same base member material, for example cut from one film, or of or cut from different base member materials, e.g. different films, e.g. each comprised of different layers.

Figure 11:
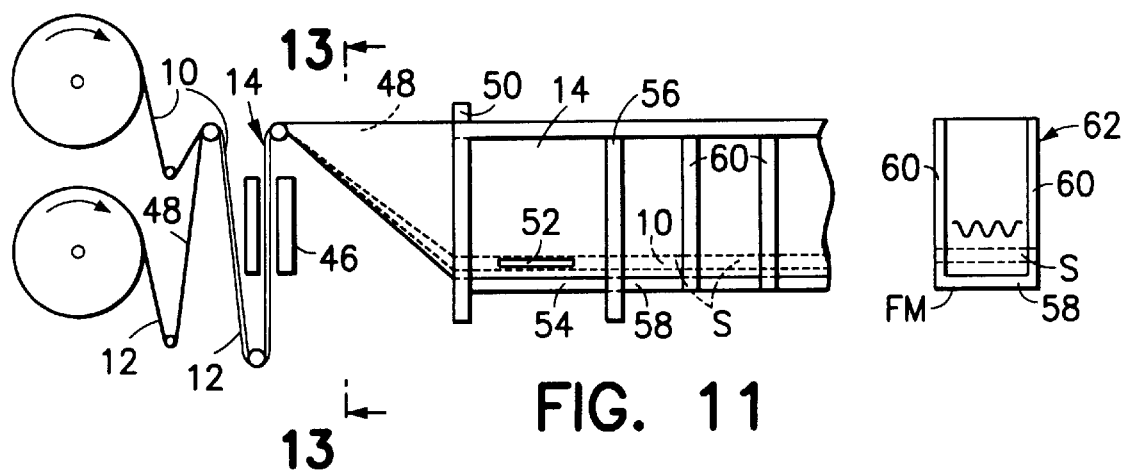
FIG. 11 is a side plan view with portions broken away of apparatus performing a preferred method of making a packaging material and package of this invention.

FIG. 11 shows a two-step approach of the method of the invention wherein a base member material 12 is unwound from a supply roll and brought over an upper tension roller, where strip 10, unwound from a second roll, is brought into contact with a heat sealable surface 48 of the base member material. Base member material 12 and strip 10 are moved downward under another tension roll and up between heat seal bars 46 which clamp upon and secure, here, heat seal strip 10 to base member 12.

Base member material 12 with strip 10 heat sealed thereto comprise packaging material 14. It is moved upwardly over a tension roll after which the packaging material (being moved to the right), is folded over a suitable mandrel or forming platform (not shown) such that base member 12 is brought into an overlapping relationship with strip 10 (dashed line) and so that heat sealable surface 48 is on each side of and faces the strip. As the packaging material passes to the right, it passes between a pair of opposed bars 50 which maintain the packaging material in close overlapping relationship, and then between a second pair of heat sealing bars 52 which clamp together and heat seal the base member material along and by means of the strip to form a peelable and reclosable seal S. In this embodiment of the method, opposed horizontal bottom heat seal bars 54 and vertical heat seal bars 56 close upon the overlapped packaging material to respectively impose a bottom heat seal 58 and side heat seals 60. These side heat seals are then cut vertically within their widths by suitable means to form a heat sealed, easy-opening reclosable package 62, here, a pouch or bag having a cavity. The pouch is shown unfilled and with an unsealed top. In this embodiment of the package, strip seal generally designated S of package 62 is located adjacent or near the bottom folded margin M of the package, but not within bottom heat seal 58. Filling apparatus and steps can be employed in the same line or off-line to fill and top seal the pouch to form a filled, closed package.

Figure 12:
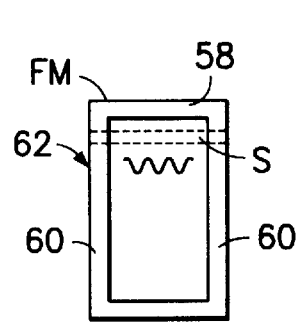
FIG. 12 is front elevational view of a filled and sealed package of this invention.

As shown in FIG. 12, after package 62 is filled and sealed, it is inverted such that strip seal S is adjacent the top folded margin FM of the package where the packaging material is folded over. The package is opened by cutting it along the top between heat seal 58 and strip seal S. Strip seal S can then be pulled apart, to gain access to the contents. The package can be reclosed by application of manual pressure on the package along the strip seal.

Figure 13:
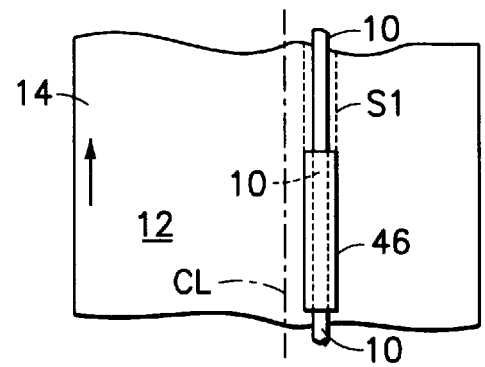
FIG. 13 is an elevational view with portions broken away as seen along line 13—13 of FIG. 12.

FIG. 13, a partial side plan view taken along line 13—13 of FIG. 11, shows strip 10 on or near base member material 12 positioned to the right of center line CL of the material and both passing under opposed heat seal bars 46 (one shown) which secure the strip to the base member material with a first heat seal S1 that is wider than the width of strip 10.

Figure 14:
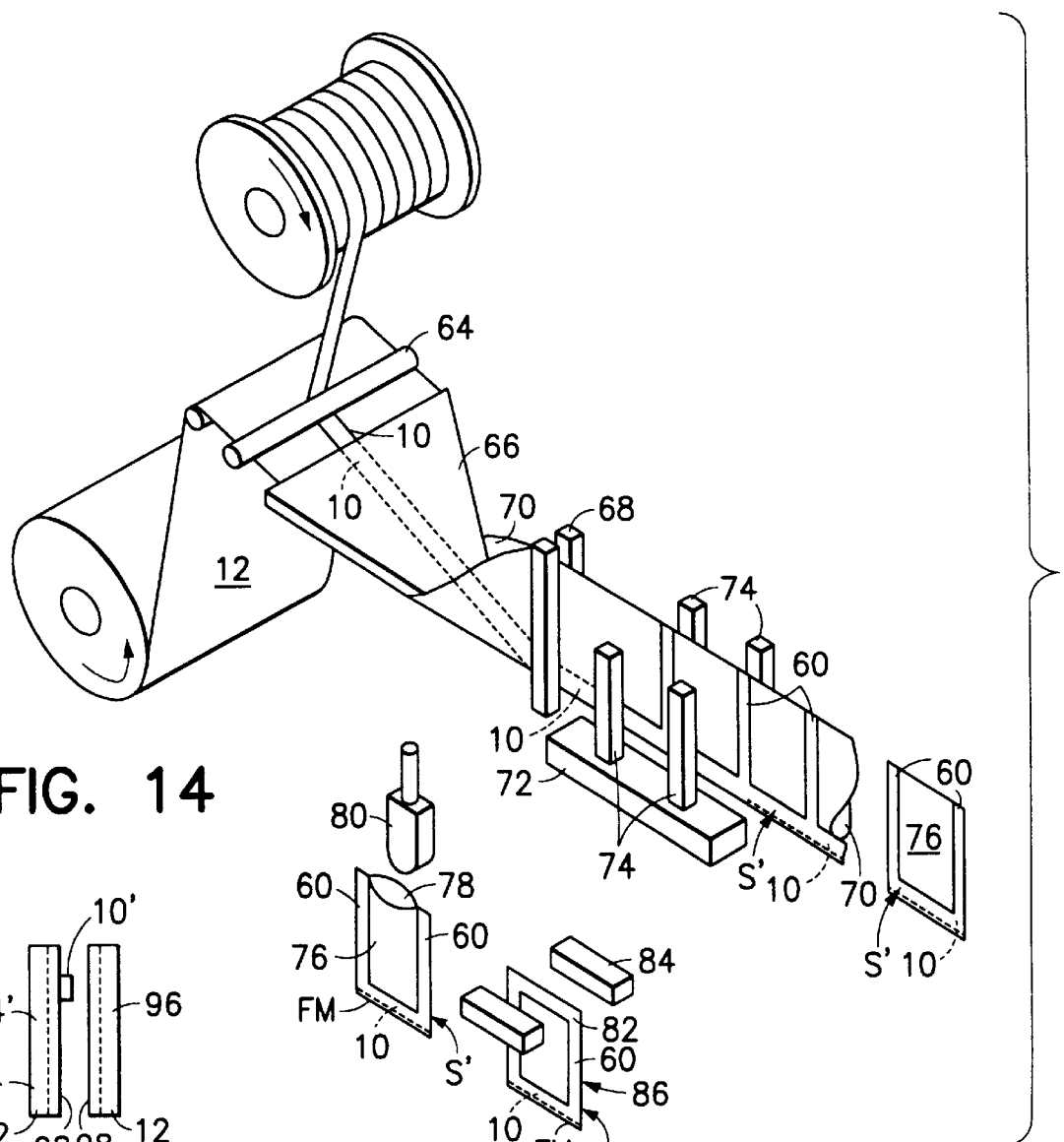
FIG. 14 is a perspective view with portions broken away showing another embodiment of apparatus performing a method of making a packaging material and packages of this invention.

FIG. 14 shows a one-step approach of the method of this invention wherein a base member material 12 unwound from a lower supply roll is bought up over a tension roll and then downward at a slight angle to where strip 10, unwound from an upper supply roll, is brought near to or in contact with base member material 12 as the strip passes under guide roll 64. The base member material 12 and unsecured strip 10 above it pass under frustoconical forming plate 66 where the base member is folded about the forming plate nose, and brought into a partially overlapped, juxtaposed relationship. As the base member passes between vertical spaced bars 68, the base member is brought into a more closely and fully overlapping or juxtaposed relationship wherein a heat sealable surface 70 of the base member is on each side of and faces strip 10. By suitable means if necessary (not shown), the strip is brought into position along and adjacent or near the fold line at the bottom of the base member material where a pair of horizontal base seal bars 72 heat seal the base member material along and by means of the strip to form strip heat seal generally designated S'. Simultaneously, vertical seal bars 74 form a pair of vertical side seals 60 which are subsequently cut to thereby form a package 76 having a cavity 78. Package 76 is filled with a product by filler 80 and closed by a heat seal 82 by heat seal bars 84 to form closed package 86. In the embodiment shown in FIG. 14, the width of heat seal S' is preferably the same as but can be narrower than the width of strip 10. Also, as shown by the dashed line on the package, strip heat seal S' is positioned along and adjacent or near the package's folded margin FM.

Although FIGS. 11 and 14 show the preferred method of heat sealing strip 10 to base member 12 prior to filling with product, with either the one-step or two-step approach, heat sealing of the strip to form the package can be effected after filling.

Figure 15:
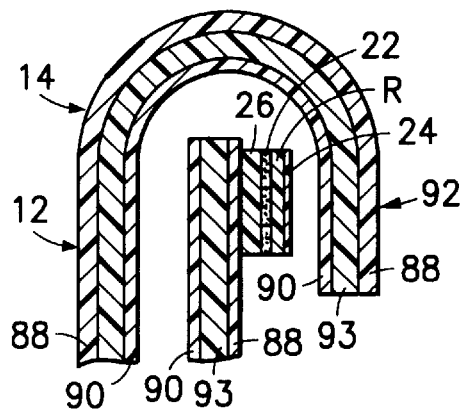
FIG. 15 is a vertical section with portions broken away through an embodiment of a packaging material of this invention, showing methods of this invention.

The method of this invention, including one-step or two-step approaches, can be employed using any suitable base member material, strip or packaging material. Preferably the base member material is a multilayer flexible film having at least one heat sealable surface, although each of its surfaces can be heat sealable. So long as they are compatible with the heat sealable surface(s), the sealant layers (s) can be heat sealed to either of the base member material heat sealable surfaces. An example is shown in FIG. 15, where a single base member material 12 is comprised of a first heat sealable surface 88 of LDPE and a different, second heat sealable surface 90 of EVA. Between them there can be a core 93 of one or more internal layers, for example, proceeding from the LDPE layer to the EVA layer: a blend of HDPE and LLDPE, adhesive, EVOH, and adhesive. The base member is folded over upon itself to provide an overlapped relationship where the two different heat sealable surfaces of the base member are on opposite sides of each other and face strip 10. Strip 10 (proceeding from right to left) is comprised of a first sealant layer 24 of a blend of ionomer and EMA facing the EVA surface 90, a rupturable layer R of ionomer, tacky adhesive layer 22, and second sealant layer 26 comprised of a blend of HDPE and EVA facing and here shown secured or heat sealed to the LDPE surface 88 of base member 12. Base member 12 and strip 10 secured thereto comprises a packaging material 14. From FIG. 15 it can be envisioned that the one-step approach of the method can be performed with the shown overlapping relationship if the strip were not yet secured, and it can be envisioned that a package can be made by the two-step approach by heat sealing the surface 90 of EVA of base member flap 92 to strip first sealant layer 24.

Figure 16:
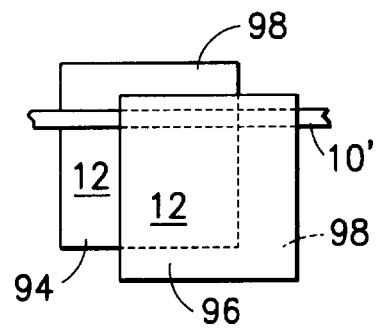
FIG. 16 is a front elevational view with portions broken away showing an embodiment of the method of this invention employed using separate panels of base member material.
Figure 17:
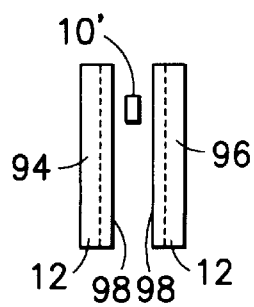
FIGS. 17 and 18 are side elevational views, FIG. 17 as would be seen of the panels and strip of FIG. 16, and FIG. 18 of the strip secured to a panel of FIG. 17.
Figure 18:
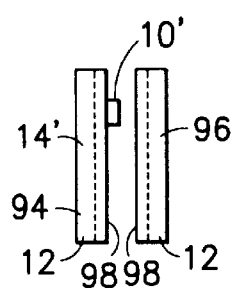
Figure 19:
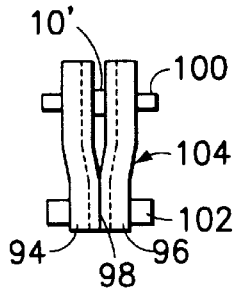
FIG. 19 is a vertical section through a package as would be formed from the panels of FIGS. 16–18.

As shown in FIGS. 16–19, the method of this invention, including either the one-step or two-step approach, can be employed using two separate panels or pieces of the same or different base member materials, each panel having at least one heat sealable surface. As shown in FIG. 16, two separate panels 94,96 (assumed for now to be the same base member material 12), each having at least one heat sealable surface 98, are brought into an overlapping relationship with their respective heat sealable surfaces facing each other with a multilayer strip generally designated 10' of this invention therebetween. Each sealant surface of the strip is heat sealable to the base member surface it faces. As shown in FIG. 17, in a one-step approach, strip 10 may be positioned between and without contacting one or both panels 94,96. FIG. 18 shows a two-step approach wherein strip 10' is secured as by heat sealing to base member panel 94 to comprise packaging material 14'. FIG. 19 shows two sets of opposed heat sealing bars 100 and 102, each heat sealing the panels together, bars 100 effecting the heat seal along and by means of strip 10' to thereby form a package 104.

The method of this invention can be employed on base member material panels which are different. Panels 94,96 of base member material 12 can be single layer material or, as represented by one or both by the dashed lines, one or both of them can be multilayered. In FIGS. 16–19, the same first heat sealable surface of each panel faces the strip. However, it will be understood that the method of this invention can be effected by use of overlapping panels one or each of which has a second heat sealable surface. Either approach of the method can be employed using such panels, in any suitable sealant layer-heat sealable surface interface combination, including a combination where the first heat sealable surface layer of one panel and the second heat sealable surface layer of the other panel are on opposite sides of and face the strip. This combination would be similar to the embodiment shown in FIG. 15 except instead of there being one base member as in FIG. 15, there would be two panels of the same base member material or of different base member materials. In accordance with the method of this invention, the base member material be it an elongated film, one panel or a pair of opposed panels, can be or include an impression for forming a package or lidstock and the width of the strip secured to be secured thereto can be up to one half of the width of surface area of the impression, package or lidstock.

According to the method of this invention with either the one-step or two-step approach, prior to heat sealing the strip to the base member material to form a package of the invention, a heat sealable surface of the base member material, whether one film or a panel thereof, which is not secured to the strip can be bonded to a semi-rigid substrate.

This invention includes methods of making heat sealed, easy-opening, reclosable packages and the packages themselves wherein the base member has an easy-opening feature in addition to the strip heat seal.

Figure 20:
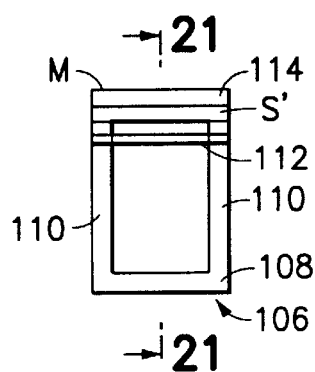
FIG. 20 is a front elevation of an embodiment of a package of this invention.
Figure 21:
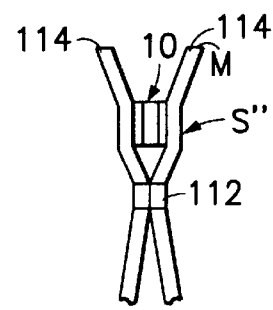
FIG. 21 is a vertical section with portions broken away as would be seen along line 21—21 of FIG. 20.

FIGS. 20 and/or 21 show a representative package 106 wherein the base member material of the package is heat sealed by bottom seal 108, side heat seals 110, an easy-opening seal 112 here shown as being a heat seal which is peelable but not reclosable, and a strip seal S" according to the invention and which is proximate or adjacent to and closer to the top margin M or marginal edge of the package than is easy-opening seal 112. With this combination of seals, seal 112 seals the product head space and isolates the product contents and headspace from objectionable odors which may be imparted from the tacky adhesive layer of strip 10 of strip seal S'. This package is opened by pulling apart the unsealed flaps 114 at the top of the package, pulling the strip seal S" and then seal 112 apart. Thereafter, the package can be reclosed by use of strip seal S".

The additional easy opening feature can be provided by any suitable means, such as by one or more lines of weakness, or score lines, e.g. one or more laser scores, e.g. parallel score lines which provide a tear strip. In such cases, the easy opening feature would be positioned closer to a margin of the package than the strip heat seal of this invention would be that margin.

The method of this invention, including the one or two-step approach, can be used to form a packaging material and to heat seal it strip side down to a heat sealable surface of a base structure which can be a container or substantially flat structure. In this use of the method, the base member material can comprise lidstock which is sealed strip side down to a heat sealable surface, for example a flange or lip of the base structure. The base member material can be rigid, or flexible, including semi-rigid. Preferably it is flexible. The method can include bonding to a substrate, the surface of the base member material which is not or not to be secured to strip. The substrate can be any suitable, preferably flexible material.

The heat sealed, easy-opening and reclosable package of this invention is comprised of a packaging material in turn comprised of a heat sealable base member material, and an elongate, multilayer flexible peelable and reclosable strip of the invention positioned between the surfaces of juxtaposed portions of base member material, the base member material being heat sealed together including along and by means of the strip whereat the sealant layers of the strip are heat sealed to the base member. The heat seal obtained is of the peelable reclosable type described and shown herein. The package can be any suitable package made by use of any suitable base member material and strip or packaging material described herein. The strip sealant layer to base member material heat sealable surface heat seal or heat seals can be of any suitable combination. Preferably, and most commonly, each strip sealant layer of the strip is heat sealed to the first heat sealable surface of the base member (Package Examples I–VII below), although one strip sealant layer can be heat sealed to one, say the first, base member heat sealable surface and the other sealant layer can be heat sealed to the other, say the second, base member heat sealable surface (See Package Examples VIII–X below).

The following are examples of packages of the invention.

EXAMPLE I

Figure 22:
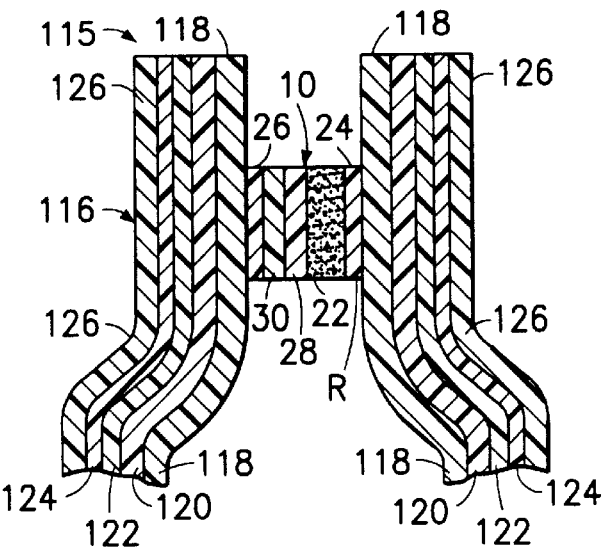
FIG. 22 is a vertical section with portions broken away showing an embodiment of a package of this invention.

An example of such a package heat sealed using the preferred combination of strip sealant layers to base member heat sealable layer is that designated 115 and shown in FIG. 22 wherein the five-layer embodiment of strip 10 disclosed in reference to FIG. 7 and referred to as sample 5A in connection with the Tables below, has each of its first and second sealant layers 24, 26 of ionomer heat sealed to juxtaposed surface portions of a conventional base member material 116 having a 1.05 mil inner heat sealable layer 118 of ionomer (a sodium-neutralized ionomer commercially available from Du Pont under is trademark SURLYN). Base member material 116 has the following additional layers proceeding to its exterior layer: a layer 120 of EVA, a layer 122 of adhesive comprised of a maleic anhydride modified LDPE, a layer 124 of EVOH, and a layer 126 of polyamide (Nylon 6). Base member 116 was made by a tubular film coextrusion process. The initial opening and reclose seal strengths for strip 5A are described in Table IV.

EXAMPLE II

Another example of a package heat sealed by a strip having ionomer sealant layers is that wherein strip 3A of the Tables has each of its ionomer sealant layers heat sealed to ionomer layer 118 of the base member 116 referred to in Packaging Example I. The initial opening and reclose seal strengths of strip 3A are described in Table IV.

EXAMPLE III

Another example of a package heat sealed with the preferred combination is that wherein the 4-layer strip embodiment disclosed in connection with FIG. 6 and described as strip 4A in the Tables has each of its HDPE-EVA blend and EVA sealant layers heat sealed to a 0.6 mil heat sealable surface of EVA of a conventional base member material whose additional layers, proceeding from the EVA layer are: LLDPE, a urethane-based adhesive, and 0.5 mil PET. This base member was made by adhesive lamination of a tubular blown film to PET. The initial opening and reclose seal strengths of the strip are described of strip 4A in Table IV.

EXAMPLE IV

An example of a package of the invention which could be formed is one using the 4-layer strip embodiment disclosed in connection with FIG. 6 and described as strip 4B in the Tables wherein each of its first sealant layer blend of ionomer and EMA and its second sealant layer blend of HDPE and EVA are heat sealed to a 0.55 mil EVA heat sealable surface of a base member material having the following additional layers proceeding from the EVA layer: adhesive (maleic anhydride modified polyethylene), EVOH, same adhesive, a blend of about 80 percent HDPE and about 20 percent LLDPE, print, and a 0.7 mil second heat sealable layer of LDPE. This base member material was manufactured by tubular die extrusion followed by extrusion coating.

EXAMPLE V

Another example of a package of the invention which could be formed is that wherein each blend sealant layer of strip 4B is heat sealed to a base member material comprised of the same layers as the base member material referred to in Package Example 4, except that the EVA layer is replaced with a 0.55 mil inner heat sealable linear ethylene alpha-olefin copolymer catalyzed by a single site metallocene catalyst (commercially available from Exxon Chemical Company under its trademark EXACT), and each strip sealant layer is heat sealed to the ethylene alpha-olefin polymer.

EXAMPLE VI

Another example of a package of the invention which could be formed is that wherein a 4-layer strip referred to in Table 1A as sample 4E in Table 1A forms a package wherein each of the strip's first sealant layer of ionomer and a second sealant layer of LLDPE is heat sealed to the heat sealable surface of a base member 0.4 mil inner layer of a linear ethylene alpha-olefin copolymer catalyzed by a single site metallocene catalyst (commercially available from Exxon Chemical Company under its trademark EXACT), wherein the base member includes the following additional layers proceeding from the aforementioned copolymer inner layer: LLDPE, a urethane-based adhesive and PET.

EXAMPLE VII

Another example of a package of the invention which could be formed is that wherein each LDPE sealant layer of strip 7A referred to in the Tables and discussed in connection with FIG. 8 is heat sealed to the linear alpha-olefin copolymer inner sealant layer of the base member material referred to in Package Example VI.

EXAMPLE VIII

Figure 23:
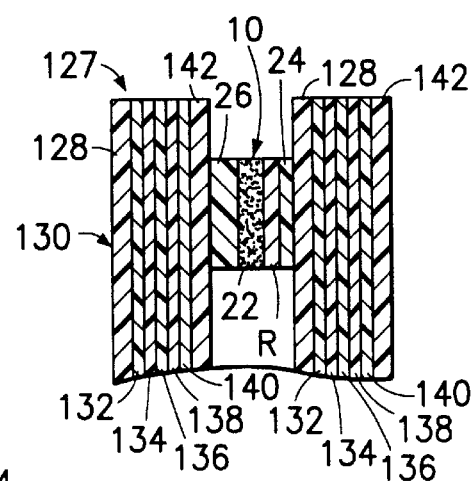
FIG. 23 is a vertical section with portions broken away showing an embodiment of a package of this invention.

An example of a package of this invention wherein one strip sealant layer is heat sealed to one heat sealable surface of base member material and the other strip sealant material is heat sealed to the base member other heat sealable surface is that generally designated 127 and shown in FIG. 23. In FIG. 23, the 4-layer embodiment of strip 10 disclosed in reference to FIG. 6 and referred to as strip 4A in the Tables, has its strip first sealant layer 24 of EVA heat sealed to a 0.55 mil inner heat sealable layer 128 of EVA of the base member material here designated 130 and described in Package Example IV, and has its strip sealant layer 26 of a blend of HDPE and EVA heat sealed to the surface of the 0.7 mil exterior second heat sealable layer 142 of LDPE. Base member 130 has the following additional layers proceeding from EVA layer 128, to the LDPE exterior layer 142: adhesive layer 132, EVOH layer 134, adhesive layer 136, layer 138 comprised of a blend of HDPE and LLDPE and print layer 140. The initial opening and reclose seal strengths of the strip are described for sample 4A in Table IV.

EXAMPLE IX

An example of a package of this invention wherein one strip sealant layer can be heat sealed to one heat sealable surface of base member material and the other strip sealant material is heat sealed to the other heat sealable surface, is that wherein the 4-layer embodiment of strip 10 disclosed in reference to FIG. 6 and referred to as sample 4B in the Tables and discussed in Package Example IV would form a package wherein the strip first sealant layer blend of ionomer and EMA is heat sealed to the surface of inner heat sealable layer of EVA of the base member material referred to in Package Example 4, and the strip second sealant layer blend of HDPE and EVA is heat sealed to that base member's exterior second heat sealable layer of LDPE.

EXAMPLE X

Another example of a package of this invention of the type referred to in Package Examples VIII and IX is one wherein strip 5C in the Tables has its first sealant layer of EVA heat sealed to the surface of the inner heat sealable layer of EVA of the base member material described in Package Example III above, and has its second sealant layer of heat sealable coating (HSC) heat sealed to the surface of the exterior heat sealable layer of PET of that base member material.

It is to be understood that the strips, base member materials, packaging materials and packages disclosed above and below, as well as others which are apparent in view of this specification are not to be considered as a limitation of the present invention, the scope of which is defined by the claims.

Except for strip structure 7A (Package Example VII) which was made by adhesive lamination as described in connection with FIG. 8, all strips referred to in the Package Examples were made by coextrusion of a multilayer flexible film using a tubular die with air cooling. The coextrusion temperatures were about 380° F. for the tacky adhesive and were conventional extrusion temperatures for the respective other layer materials. For these materials, extrusion temperatures ranged from about 380° F. to about 415° F. The films were wound on a roll, then unwound and cut along the machine direction into strips one inch wide, then the strips were cut into strips specimens several inches long. Unless otherwise indicated in the Examples, the strips were heat sealed between the facing heat sealable layer of strip-facing overlapped portions of the base member materials referred to in the Examples. Heat seals of the strips, usually made by a two-step approach, but whether made by the one or two step approach were made at 270° F. under 50 psi jaw pressure for 1 second on a Sentinel Sealer equipped with 1 inch wide flat seal jaws. The strip samples were made so that an unsealed graspable portion of the base member extended beyond the heat sealed area.

The seal strengths of the heat sealed strips discussed in Table IV were obtained by testing the strips in an Instron tester according to ASTM F-88. Initial Opening Peak and Average strengths were obtained. The heat sealed strips were mounted in the Instron and separated by pulling, at 5 inch/min, the portions of the base member that were not heat sealed. The peak force and the average force recorded by the Instron in lb/in (g/cm) were recorded in Table IV below.

Opening-after-reclose seal strengths of the heat sealed strip were obtained as follows: the opened heat seals were reclosed by using a heat sealer with jaws at room temperature with a pressure of 50 psi for 0.5 seconds. The reclosed specimens were mounted in an Instron and separated by pulling, at 5 inch/min, the portions of the base member that were not reclosed. The peak force and the average force recorded by the Instron were also recorded in Table IV.

Figure 24:
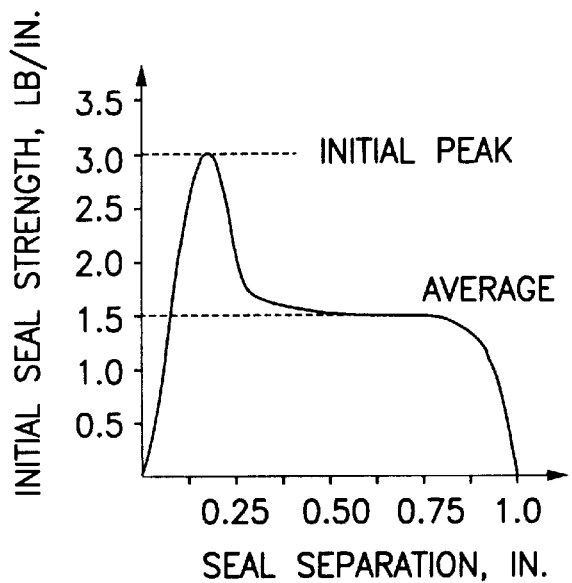
FIG. 24 is a graph showing a curve which indicates strip initial peak and average seal strengths which are within the invention.

FIG. 24 shows a graph for explanation purposes which generally indicates the shape of a curve obtained for an initial peak strength, and shows the level of adhesion in lb/in (g/cm) between the strip rupturable and tacky adhesive layers in terms of the force exerted upon initial rupturing when these layers are initially pulled apart, as well as the average seal strength during delamination between these layers as they continue to be pulled apart during opening. The shape of the curve is generally representative of seal strengths both on initial opening and on opening after reclose, although the values for the later preferably should be lower.

As will be seen from the explanation below, the seal strengths of each of the strips shown on Table IV were acceptable.

The initial opening peak seal strength of the seal or bond between an about a 0.5 mil thick or greater rupturable layer and an about 0.1 to about 2.0 mil thick tacky adhesive layer of a coextruded strip preferably is from about 2.0 to about 4.4 lb/in (357–786 g/cm), more preferably about 3.0 lb/in (536 g/cm).

The average seal strength after initial opening during delamination for these layers of coextruded strips preferably is from about 1.1 to about 2.4 lb/in (197 g/cm–433 g/cm).

The opening seal strength after reclose for these layers of coextruded strips preferably is from about 0.28 to about 0.77 lb/inch (49 g/cm–138 g/cm), more preferably about 0.50 lb/in (89 g/cm). These seal strength ranges discussed above are merely preferred ranges and are not to be taken as limiting the invention. For example, for coextruded rupturable layers less than 0.5 mil thick the seal strengths can be below these preferred ranges. Also for thicker rupturable layers and tacky adhesive layers, the above values could be higher. The values would also be expected to be higher for such layers of laminated strips, particularly those having lower viscosities and/or utilizing low molecular weight polymers. It is understood that the acceptable seal strength ranges can also vary depending on the rigidity of the layers. Preferably, the seal strength values are as low as possible while still meeting the objectives of easy-opening, peelable and reclosable heat seals of the invention.

The heat sealed, easy-opening and reclosable packages of this invention include packages comprised of a base member and strip of this invention, whether or not in the form of a packaging material, and a base structure having a heat sealable surface, wherein the base member material is heat sealed to the base structure along and by means of the strip whereat one of the sealant layers of the strip is heat sealed to a heat sealable surface of the base member, and the other sealant layer of the strip is heat sealed to the heat sealable surface of the base structure, the heat seal being of the easy-opening peelable, reclosable type disclosed herein. The base member, strip and/or packaging materials employed can be or include any of the base members of the type disclosed herein. The base structure can be any suitable structure for forming a package, for example, a formed container having a cavity, or a flat structure, the latter for example, for use with a packaging material or base member having a cavity. The package, base structure, packaging material and its components can be made by any suitable method, including those disclosed herein.

The Tables below show examples of strips of the invention, Tables 1A and II showing strip structures and the materials of their layers, Tables 1B and III showing their layer thicknesses, and Table IV their seal strengths. Table V lists and identifies the polymer material and supliers of the material comprising the layers of the strip structures.

TABLE IA

STRUCTURES OF THREE AND FOUR LAYER STRIPS

| STRIP STRUCTURE | SECOND SEALANT LAYER | LI | TA | RUPTURABLE LAYER | FIRST SEALANT LAYER |
|---|---|---|---|---|---|
| FIRST SECTION | | | | | |
| 3A | Ion #1 | | TA #1 | Ion #1 ** | |
| 3B | Ion #1 | | 90% TA #1 10% Ion #1 | Ion #1 ** | |
| 4A | 38% EVA #1 58% HDPE + 4% AB | | TA #1 | Ion #3 | EVA #1 |
| 4B | 38% EVA #1 + 58% HDPE 4% AB | | TA #1 | Ion #3 | 60% Ion #3 + 40% EMA |
| 4C | EVA #2 | | TA #1 | Ion #1 | EVA #1 |
| 4D | LLDPE | | TA #1 | Ion #2 | EVA #1 |

TABLE IA-continued

STRUCTURES OF THREE AND FOUR LAYER STRIPS

| STRIP STRUCTURE | SECOND SEALANT LAYER | L1 | TA | RUPTURABLE LAYER | FIRST SEALANT LAYER |
|---|---|---|---|---|---|
| SECOND SECTION | | | | | |
| 4E | LLDPE | EVA | TA #1 | Ion #1 ** | |

TA indicates Tacky Adhesive Layer
** indicates the rupturable layer is the first sealant layer
Ion #1 indicates ionomer #1 material listed on Table I
AB indicates anti-block material
% indicates the weight percent that was specified for production of a sample strip but does not necessarily represent the actual weight percent of the component of the blend made.

TABLE IB

THICKNESSES OF LAYERS OF THREE AND FOUR LAYER STRIPS
(MILS)

| STRIP STRUCTURE | SECOND SEALANT LAYER | | TA | RUPTUR-ABLE LAYER | FIRST SEALANT LAYER |
|---|---|---|---|---|---|
| 3A | 1.07 | | 0.89 | 0.66 ** | — |
| 3B | 0.92 | | 0.98 | 0.63 | — |
| 4A | 1.31 | | 1.15 | 0.42 | 0.16 |
| 4B | 1.3 | | 1.0 | 0.3 | 0.1 |
| 4C | 1.5 | | 0.7 | 0.2 | 0.1 |
| 4D | 1.5 | | 0.7 | 0.075 | 0.075 |
| 4E | 1.0 | 0.5 (L1) | 0.7 | 0.3 ** | |

TABLE II

STRUCTURES OF FIVE AND SEVEN LAYER STRIPS

| | | | | FIRST SECTION | | | | | | |
|---|---|---|---|---|---|---|---|---|---|---|
| STRUCTURE | SECOND SEALANT LAYER | L1 | L2 | L3 | L4 | TA | RUPTURABLE LAYER | L5 | FIRST SEALANT LAYER |
| 5A | Ion #1 | HDPE | EVA #2 | — | — | TA #1 | Ion #3 ** | — | |
| 5B | 50% EVA #2 + 50% LLDPE | — | — | — | — | TA #1 | Ion #3 | 97% LLDPE # + 3% OA | LLDPE |
| 5C | HSC | 40% EVA 31 + 60% HDPE | — | — | — | TA #1 | Ion #3 | — | EVA #1 |
| 7A | LDPE | Adh | PET | Adh | LDPE | TA #2 | LDPE ** | — | |

| | | | SECOND SECTION | | | | |
|---|---|---|---|---|---|---|---|
| STRIP STRUCTURE | SECOND SEALANT LAYER | TA | RUPTURABLE | L1 | L2 | L3 | FIRST SEALANT LAYER |
| 7B | 38% EVA #2 + 58% HDPE + 4% AB | TA #1 | Ion #3 | 50% LLDPE #1 + 50% CXA | EVOH | 50% LLDPE #1 + 50% CXA | LLDPE #1 |

L1 indicates intermediate layer number one
** indicates rupturable layer is the first sealant layer
— indicates this layer not present in this structure.
HSC indicates heat seal coating
Adh indicates adhesive

TABLE III

THICKNESSES OF LAYERS OF FIVE AND SEVEN LAYER STRIPS

FIRST SECTION

| STRIP STRUCTURE | SECOND SEALANT LAYER | L1 | L2 | L3 | L4 | TA | RUPTURABLE | L5 | FIRST SEALANT LAYER |
|---|---|---|---|---|---|---|---|---|---|
| 5A | 0.42 | 0.48 | 0.22 | — | — | 1.10 | 0.43 ** | — | — |
| 5B | 1.5 | — | — | — | — | 1.0 | 0.1 | 0.1 | 0.1 |
| 5C | 0.2 | 1.3 | — | — | — | 1.0 | 0.2 | — | 0.1 |
| 7A | 0.6 | 0.1 | 0.5 | 0.1 | 0.6 | 1.3 | 0.6 ** | — | — |

SECOND SECTION

| STRUCTURE | SECOND SEALANT LAYER | TA | RUPTURABLE | L1 | L2 | L3 | FIRST SEALANT LAYER |
|---|---|---|---|---|---|---|---|
| 7B | 1.5 | 1.0 | 0.07 | 0.07 | 0.07 | 0.07 | 0.07 |

** indicates rupturable layer is the first sealant layer
— indicates this layer not present in this structure

TABLE IV

SEAL STRENGTHS OF SELECTED STRUCTURES FROM TABLES

| STRIP STRUCTURE | INITIAL OPENING | | OPENING AFTER RECLOSE | |
|---|---|---|---|---|
| | PEAK | AVERAGE | PEAK | AVERAGE |
| 3A | 3.6 lb/in (640 g/cm) | 2.0 lb.in (360 g/cm) | 1.3 lb/in (240 g/cm) | .61 lb/in (110 g/cm) |
| 4A | 3.0 lb/in (540 g/cm) | 1.9 lb/in (340 g/cm) | 0.90 lb/in (160 g/cm) | 0.63 lb/in (110 g/cm) |
| 5A | 2.5 lb/in (470 g/cm) | 1.6 lb/in (280 g/cm) | 0.76 lb/in (140 g/cm) | 0.36 lb/in (64 g/cm) |
| 7A | 2.6 lb/in (470 g/cm) | 1.1 lb/in (200 g/cm) | — | 1.1 lb/in (200 g/cm) |

— indicates not recorded

TABLE V

| MATERIAL NAME | SUPPLIER | COMPOSITION |
|---|---|---|
| Surlyn 1652-5B (Ion #1) | E I DuPont de Nemours & Co. | Copolymer of ethylene and methacrylic acid, partially neutralized with zinc, 5 Melt Index (MI). |
| Surlyn 1601-B (Ion #2) | E I DuPont | Copolymer of ethylene and methacrylic acid, partially neutralized with sodium, 1.3 MI. |
| DS4032 (Ion #3) | Chevron Chemical | Copolymer of ethylene methacrylate, partially neutralized with sodium, 0.8 MI. |
| EMA 2205 | Chevron Chemical | Ethylene-Methacrylate copolymer, 20% MA, 2 MI |
| CXA 4164 | E I DuPont | Adhesive tie resin of maleic-anhydride modified LLDPE. |
| HDPE LM 6180 | Quantum Chemical Co. | High Density Polyethylene, 0.96 g/cc, 1.15 MI |
| AB CM10578 | Quantum Chemical Co. | Antiblock concentrate, LDPE-based |
| TA #1 M3062 | Findley Adhesives, Inc. | Pressure sensitive styrene isoprene copolymer hot melt adhesive extrudable at 380° F., 5 MI |
| TA #2 HL2021 | H. B. Fuller Co. | Coatable hot melt, styrene-isoprene block copolymer |
| TA #2 Nevex 100 | Neville Chemical Co. | Hydrocarbon tackifier, 5 carbon atom chain length |
| EVA #1 LD 312.92 | Exxon Chemical Co. | EVA copolymer, 9% VA, 2.2 MI |
| EA #2 LVD 318.92 | Exxon | EVA copolymer, 4.7% VA, 1 MI |
| OA Abscents 3000 | Universal Oil Products | Zeolite odor absorber in an LLDPE resin carrier |
| HSC | Morton International | Heat seat gel lacquer coating of a |

TABLE V-continued

| MATERIAL NAME | SUPPLIER | COMPOSITION |
|---|---|---|
| | | modified EVA suspension in water, 34.5% solids |
| EVOH LCF-101A | EVAL Co of America | EVOH, 32% ethylene, 1.6 MI |
| LDPE LSS-14 | Consolidated Thermoplastics Co. | 0.60 mil tubular, air-cooled blown LDPE film |

In table V the word "Surlyn" is the trademark of E.I. DuPont de Nemours & Co. As shown in Tables IB and III, it is preferred that the combined thickness of all layers to the backing or non-rupturable layer side of the tacky adhesive layer be greater than the combined thickness of all layers to the rupturable layer side of the tacky adhesive layer. This helps to direct and focus the opening force to the rupturable layer side, and the thinness of the rupturable layer(s) on the rupturable side causes the rupturable layer or layers to rupture and delaminate. Preferably the backing side layer total thickness is significantly greater, preferable about 2 or more times the total rupturable layer side thickness. As shown in Tables 1A and III, the rupturable layer need not be the thinnest layer of the structure or on its side of the tacky adhesive layer. When the rupturable layer is not the sealant layer, and when there are one or more other layers between the rupturable layer and the sealant layer, the rupturable layer can be the same or a greater thickness than the sealant layer and/or the one or more other layers, so long as their combined thickness is sufficiently less than the backing side a combined thickness, so that the rupturable layer or the layers to the rupturable side of the tacky adhesive layer rupture and delaminates from the tack adhesive layer. The layers act substantially as one and rupture and delaminate as one, and provide acceptable easy-opening, peelable reclosable heat seals in accordance with the invention.

Figure 25:
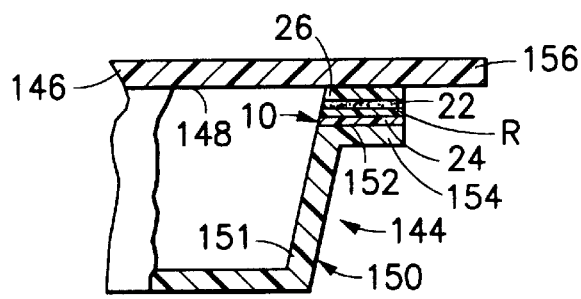
FIG. 25 is a vertical section with portions broken away of an embodiment of a package in the form of a lid heat sealed to a container along and by means of a strip.

FIG. 25 is an example of a package of this invention generally designated 144 comprised of a base member in the form of lidstock, here referred to as a lid, generally designated 146, which has a heat sealable surface 148 and which is shown as single layered but which can be multilayered. The base member preferably is generally flexible, or is flexible in and/or about the area of the heat seal, and is heat sealed to a formed container having a body 150 having a cavity and a wall 151. Container 150 is heat sealed along and by means of strip 10 (which in this example is strip 4A in the Tables) whereat strip second sealant layer 26, a blend of HDPE and EVA, is heat sealed to lid heat sealable surface 148, and strip first sealant layer 24 of EVA is heat sealed to a heat sealable surface such as 152 of container flange or lip 54. Lid 146 has means such as an extension 156 which extends beyond the edge of the lip for facilitating grasping and opening the lid. The heat seal along and by means of strip 10 is easy-opening, peelable and reclosable in accordance with the invention. Container body 150 can be a monolayer of HDPE and, although not shown, it may be coated with a suitable sealant layer, e.g. having a lower melt temperature to facilitate heat sealing of the strip to the HDPE surface at lower temperatures than without the coating. Lid 146 can be a polyester, e.g. a 0.5 mil monolayer of PET or it can for example have a thereon heat seal coating or a heat sealant layer e.g. a 0.7 mil layer of LDPE (not shown). Strip 10 can be any suitable strip.

Container 150 can be rigid, semi-rigid or flexible and can be made of any suitable material, for example such as conventionally used to form containers, e.g. olefins such as polyethylenes, polypropylenes, polystyrenes, and foil, glass and other treatable or coatable high temperature resistant materials.

Figure 26:
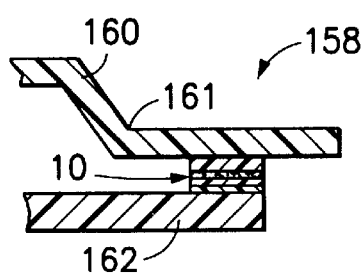
FIG. 26 is a vertical section with portions broken away of an embodiment of a package in the form of a closure heat sealed to a base structure along and by means of a strip.

FIG. 26 shows a package generally designated 158 comprised of a base member or packaging material, here in the form of a formed flexible or semi-rigid lid 160 having a cavity and heat sealed to a flat base structure 162 along and by means of a strip 10. The layers and materials comprising the base member, strip and base structure are the same although they are different from those described above with respect to package 144. Lid 160 can be adapted near the strip seal area, such as at 161, to be or have a section or portion which is flexible, or which bends, pivots or otherwise facilitates opening the strip heat seal.

Figure 27:
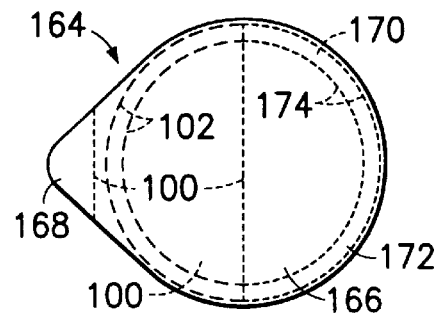
FIG. 27 is a top plan view of an embodiment of a lid heat sealed to a container along and by means of a strip.

FIG. 27 shows a package of this invention generally designated 164 having a base member or packaging material in the form of a flexible lid 166 having an extension 168 and sealed to the annular lip 170 (represented by the dashed lines) of an underlying container (not shown). Lid 166 is permanently sealed or bonded to the lip within the area 172 defined by the short dashed lines 174 extending about the right hand half of lip 170. The left-hand half of the periphery of the lid is heat sealed to a heat sealable surface of the lid along and by means of an easy-opening, peelable, reclosable strip 100 of this invention, which heat seal is represented by the longer dashed lines 102 about the periphery of the left hand half of the container lip. Strip 100 is wide and is represented and defined in the embodiment by the pair of spaced parallel dashed lines, one running through extension 168 and the other along the center of the container. In this embodiment showing an ecological stay-on lid, a consumer can easily open and gain access to the entire container cavity, and then reclose the entire container.

What is claimed is:

1. A heat sealed, easy-opening and reclosable package, which comprises a packaging material comprised of a heat sealable base member material, and an elongate, multilayer, flexible, peelable and reclosable strip positioned between and secured to the surfaces of juxtaposed portions of base member material and comprised of an interior tacky adhesive layer, a first sealant layer comprised of a first heat sealable polymer disposed to one side of the tacky adhesive layer, and a second sealant layer disposed to the other side of the tacky adhesive layer and comprised of a second heat sealable polymer, the strip including a rupturable plastic layer proximate the tacky adhesive layer, the base member material being heat sealed together including along and by means of the strip whereat the sealant layers of the strip are heat sealed to the base member, said heat seal having sufficient initial seal strength to remain closed during handling of the package and yet being manually readily openable and reclosable.

2. The package of claim 1 wherein the rupturable layer is comprised of ionomer.

3. The package of claim 1 wherein the first sealant layer is the rupturable layer and is comprised of ionomer.

4. The package of claim 1 wherein the first sealant layer is selected from the group consisting of LDPE, LLDPE, VLDPE, MDPE, HDPE, EVA, EAA, EMAA, EMA, an olefin catalyzed by a single site catalyst, blends of these polymers, and heat seal coatings.

5. The package of claim 2 wherein the first sealant layer is selected from the group consisting of LDPE, LLDPE, VLDPE, MDPE, HDPE, EVA, EAA, EMAA, EMA, an olefin catalyzed by a single site catalyst, blends of these polymers, and heat seal coatings.

6. The package of claim 1, 3, or 5 wherein the second sealant layer is selected from the group consisting of LDPE, LLDPE, VLDPE, MDPE, HDPE, EVA, EAA, EMAA, EMA, an olefin catalyzed by a single site catalyst, blends of these polymers, and heat seal coatings.

7. The package of 2 wherein the second sealant layer is comprised of EVA.

8. The package of claim 2 wherein the second sealant layer is comprised of LLDPE.

9. The package of claim 2 wherein the second sealant layer is comprised of a blend of HDPE and EVA.

10. The package of claim 3 wherein there is included a layer of EVA proximate the tacky adhesive layer between it an the second sealant layer, and a layer comprised of HDPE proximate the EVA layer, between it and the second sealant layer.

11. The package of claim 2 wherein the first sealant layer is comprised of a blend of ionomer and EMA and is proximate the rupturable ionomer layer, and the second sealant layer is comprised of a blend of HDPE and EVA and is proximate the tacky adhesive layer.

12. The package of claim 3 wherein the second sealant layer is comprised of LLDPE and from the tacky adhesive layer to the second sealant layer, there is a layer comprised of EVA and a layer comprised of LLDPE.

13. The package of claim 1 wherein the tacky adhesive layer is comprised of a hot melt tacky adhesive which melts at from about 250° to 300° F. and is comprised of from about 60 to 99% of a styrene isoprene copolymer and from about 1 to about 30% of a tackifier, the first sealant layer is comprised of LDPE, the second sealant layer is LDPE, and between the tacky adhesive layer and the second sealant layer there are the following layers proceeding from the tacky adhesive to the second sealant layer: LDPE, a heat resistant adhesive, a polymer which is heat stable at from about 250° to about 300° F. and a heat resistant adhesive.

14. The package of claim 13 wherein the heat stable polymer is comprised of a polymer selected from the group consisting of polyesters, polypropylenes, polyamides and polycarbonates.

15. The package of claim 14 wherein the tacky adhesive melts at about 270° F. and comprises about 90 percent styrene isoprene copolymer and about 10 percent of a modified hydrocarbon tackifier having five carbon atoms, the heat stable polymer is comprised of PET, and each heat resistant adhesive is comprised of a urethane adhesive.

16. The package of claim 1 wherein the strip includes a layer comprised of a material which adds tensile strength to the strip.

17. The package of claim 1 wherein the first sealant layer side of the tacky adhesive layer includes a first colorant a layer to the second sealant layer side thereof includes a second colorant which is distinguishable from the first colorant and the tacky adhesive layer and the layer to the first sealant layer side of the tacky adhesive are at least partially transparent.

18. The package of claim 1 wherein the heat seal of the second sealant layer to the base member is wider than the heat seal of the first sealant layer to the base member.

19. A heat sealed, easy-opening and reclosable package having a cavity, which comprises a packaging material comprised of a base member material having a first heat sealable surface and, secured to the heat sealable surface, an elongate, multilayer, flexible, peelable and reclosable strip positioned between and secured to juxtaposed portions of base member material and comprised of an interior tacky adhesive layer, a first sealant layer comprised of a first heat sealable polymer disposed to one side of the tacky adhesive layer, and a second sealant layer disposed to the other side of the tacky adhesive layer and comprised of a second heat sealable polymer, the strip including a rupturable plastic layer proximate the tacky adhesive layer, the base member material being heat sealed together including along and by means of the strip whereat each sealant layer of the strip is heat sealed to the first heat sealable surface of the base member, said heat seal having sufficient initial bond strength to remain closed during handling of the package and yet being manually readily pulled apart to initially open the package, the rupturable layer thereby being ruptured and pulled apart from the tacky adhesive layer to leave a surface of tacky adhesive material exposed along the opened area of the strip, the strip also enabling the package to be reclosed by the application of manual pressure upon a portion of the package against exposed tacky adhesive.

20. The package of claim 19 wherein the rupturable layer is comprised of ionomer.

21. The package of claim 19 wherein the first sealant layer is the rupturable layer and is comprised of ionomer.

22. The package of claim 19 wherein the strip first sealant layer and second sealant layer are each comprised of ionomer, and the base member is a multilayer flexible packaging film whose first heat sealable layer is comprised of ionomer.

23. The package of claim 22 wherein between the tacky adhesive layer and the second sealant layer of ionomer of the strip, starting from the tacky adhesive layer, there is included a layer comprised of EVA and a layer comprised of HDPE.

24. The package of claim 23 wherein the base member comprises a first heat sealable layer comprising an ionomer, and a heat stable polymer layer.

25. The package of claim 19 wherein the base member is a multilayer flexible packaging film, the rupturable layer is comprised of ionomer, the first sealant layer is proximate the rupturable ionomer layer and is comprised of a blend of ionomer and EMA, and the second sealant layer is proximate the tacky adhesive layer and is comprised of a blend of HDPE and EVA.

26. The package of claim 25 wherein the structure of the base member is comprised of, from inner layer to outer layer, a heat sealable layer comprised of EVA, adhesive, EVOH, adhesive, a blend of about 80 percent HDPE and about 20 percent LLDPE, print, and LDPE.

27. The package of claim 26 wherein each strip sealant layer is heat sealed to the EVA layer of the base member.

28. The package of claim 26 wherein the first sealant layer blend of ionomer and EMA is heat sealed to the EVA layer of the base member, and the second sealant layer is heat sealed to the LDPE layer of the base member.

29. The package of claim 19 wherein the tacky adhesive layer is a hot melt adhesive which melts at from about 250° to 300° F. and is comprised of from about 60 to 99% of a styrene isoprene copolymer and from about 1 to about 30% of a tackifier, the strip first sealant layer is comprised of LDPE, the second sealant layer is LDPE and between the tacky adhesive layer and the second sealant layer there are the following layers proceeding from the tacky adhesive layer to the second sealant layer: LDPE, a heat resistant adhesive, a polymer which is heat stable at from about 250° to about 300° F. and a heat resistant adhesive.

30. The package of claim 1 wherein the tacky adhesive is a hot melt pressure sensitive adhesive comprised of a blend of from about 75 to 98 percent of a tacky adhesive and about 25 to 2 percent of a non-tacky but sealable polymer which is the same as or compatible with the layers which are proximate the tacky adhesive layer.

31. The package of claim 30 wherein the non-tacky component of the tacky adhesive blend is an ionomer.

32. The package of claim 30, wherein the tacky adhesive blend of the initially opened package shows a tamper evident whitened appearance.

33. The package of claim 1 wherein the second sealant layer is not the rupturable layer and it is heat sealed to the base member material by a heat seal which is wider than the width of the strip, and the width of the heat seal of the first sealant layer to the base member is narrower than the width of the strip.

34. The package of claim 1 wherein the strip is secured to the member at a margin of the member.

35. The package of claim 1 wherein the strip is secured to the member adjacent or near a margin of the member.

36. The package of claim 1 or 19 wherein the base member has an easy opening feature in addition to the strip, and the strip is closer to a margin of the member than the easy-opening feature is to that margin.

37. The package of claim 1 wherein the strip is coextruded.

38. The package of claim 1 wherein the packaging material includes a tacky adhesive material, and a layer of the strip includes a material selected from the group consisting of a gas barrier and an odor absorber to reduce the passage of objectionable odors emanating from the tacky adhesive of the packaging material.

39. The package of claim 12 wherein the first sealant layer is comprised of ionomer, and the second sealant layer of LLDPE is heat sealed to the heat sealable surface of a base member material layer comprised of a linear alpha-olefin copolymer synthesized with a metallocene single site catalyst.

* * * * *